July 18, 1961
G. E. HAGEN
2,992,772
APPARATUS FOR INTERCOUPLING AN ACCOUNTING
MACHINE AND CARD-RECORDING EQUIPMENT
Filed Sept. 6, 1956
8 Sheets-Sheet 1
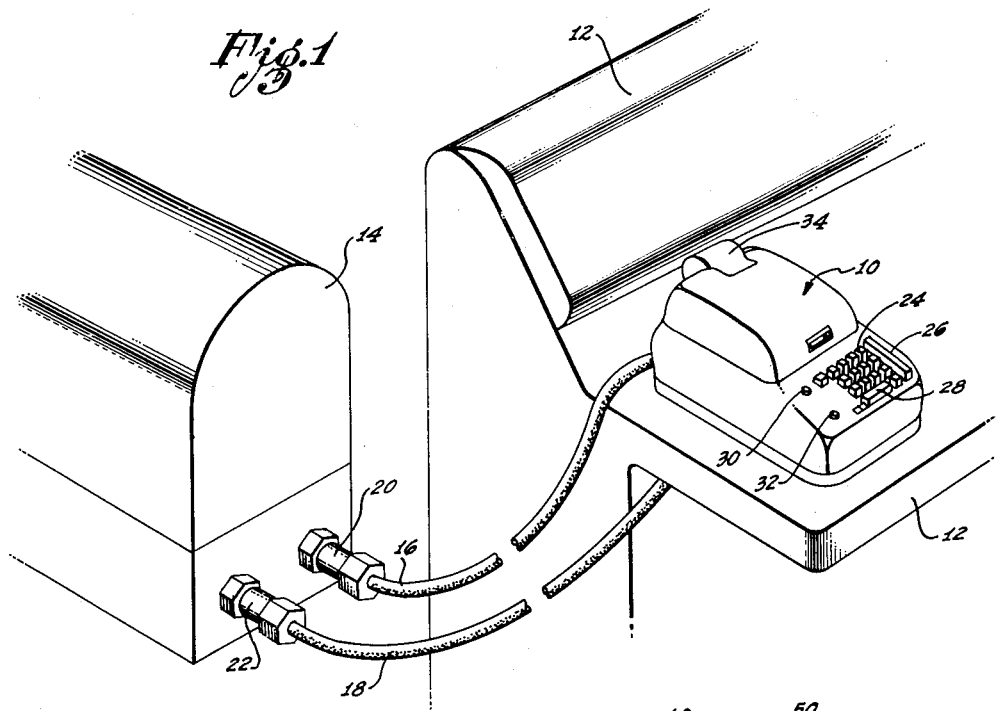
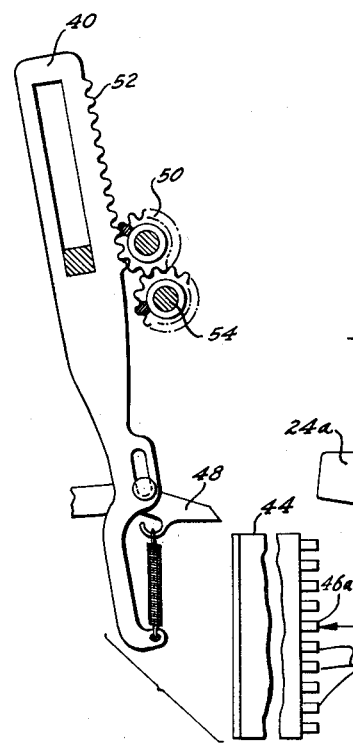
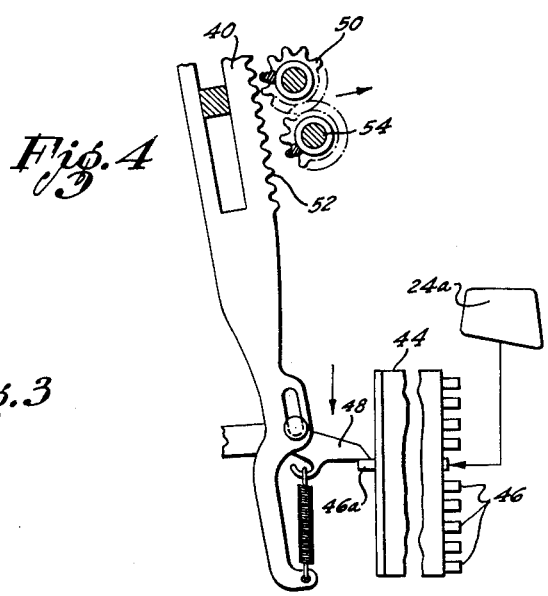
INVENTOR.
Glenn E. Hagen
BY Smyth & Roston
Attorneys July 18, 1961

G. E. HAGEN 2,992,772

APPARATUS FOR INTERCOUPLING AN ACCOUNTING
MACHINE AND CARD-RECORDING EQUIPMENT

Filed Sept. 6, 1956

INVENTOR.
Glenn E. Hagen
BY Smyth & Roston
Attorneys

INVENTOR.
Glenn E. Hagen
BY Smyth & Roston
Attorneys

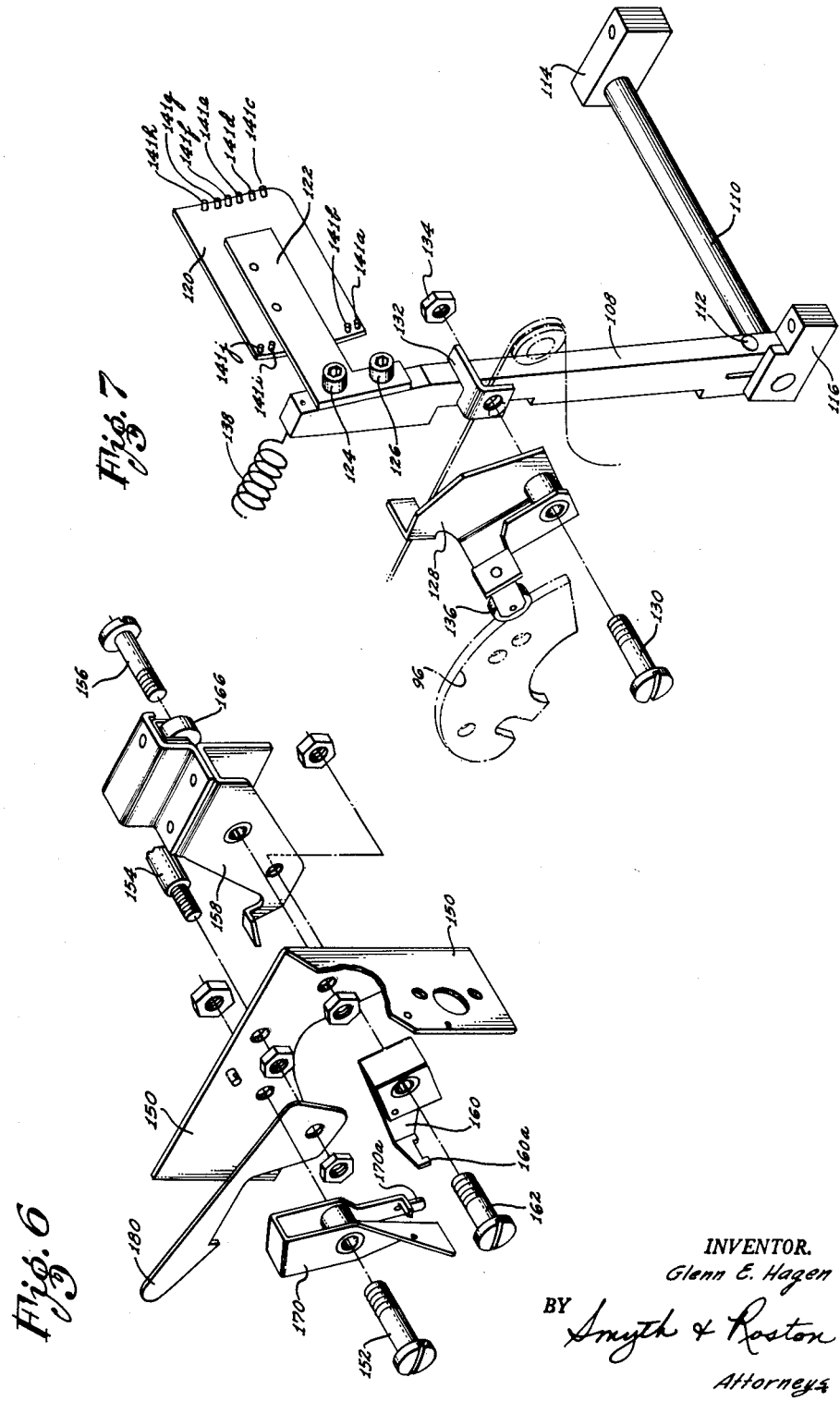

July 18, 1961
G. E. HAGEN
2,992,772
APPARATUS FOR INTERCOUPLING AN ACCOUNTING
MACHINE AND CARD-RECORDING EQUIPMENT
Filed Sept. 6, 1956
8 Sheets-Sheet 5

INVENTOR.
Glenn E. Hagen
BY Smyth & Roston
Attorneys

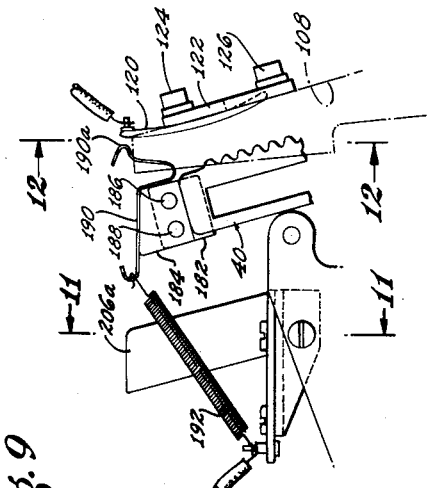

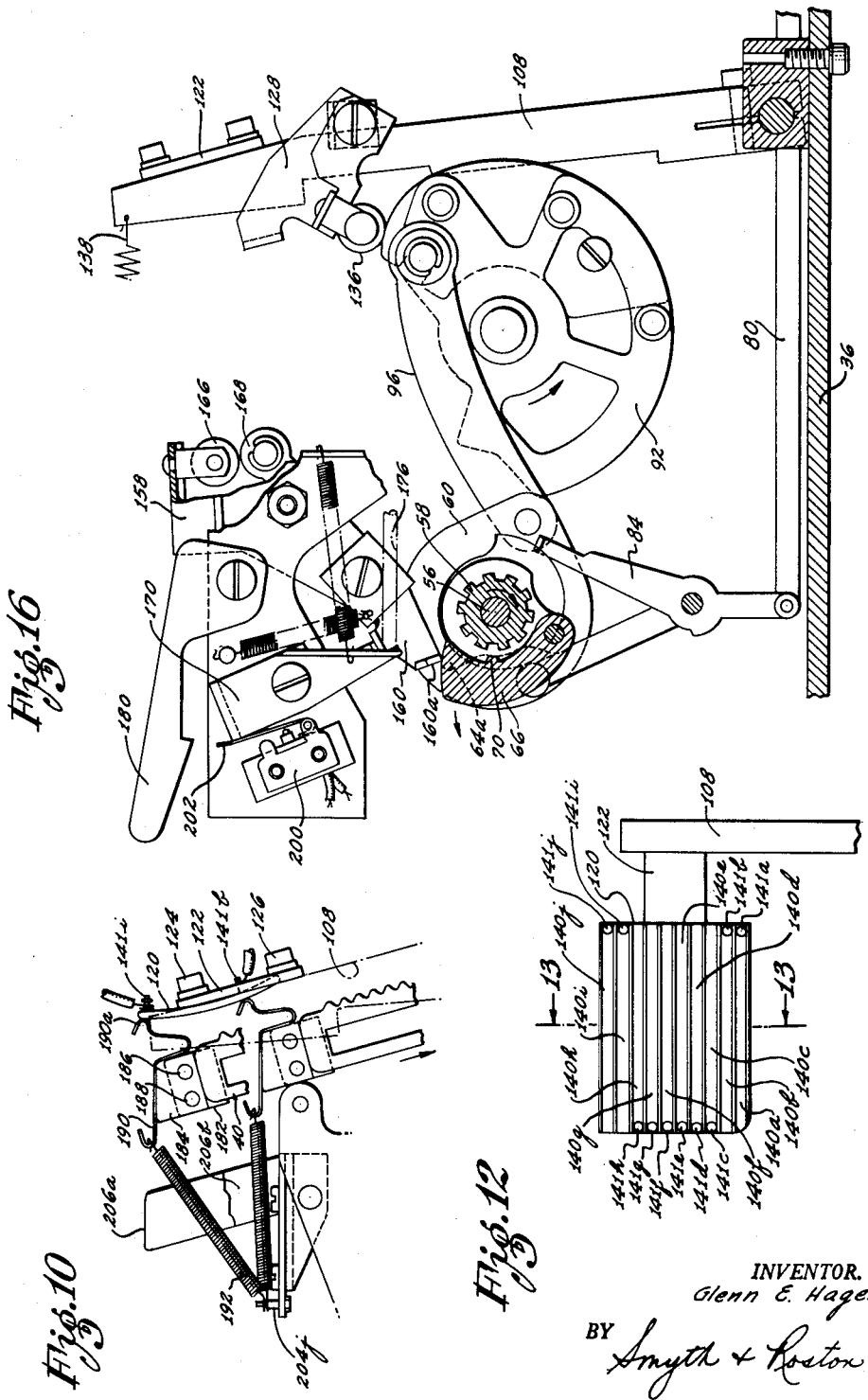

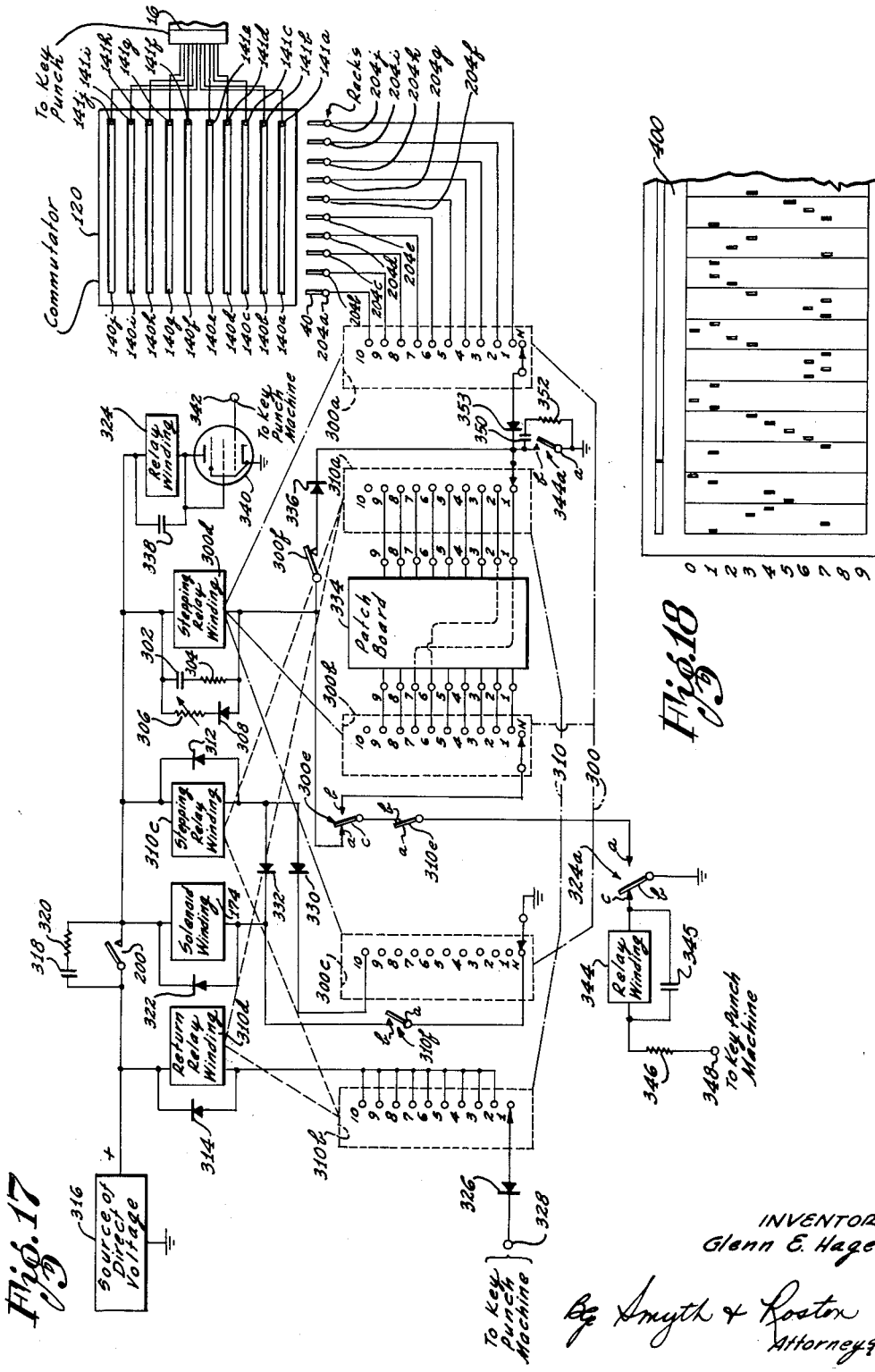

United States Patent Office 2,992,772
Patented July 18, 1961

2,992,772
APPARATUS FOR INTERCOUPLING AN ACCOUNTING MACHINE AND CARD-RECORDING EQUIPMENT
Glenn E. Hagen, New York, N.Y., assignor to Systematics, Inc., Hermosa Beach, Calif., a corporation of California
Filed Sept. 6, 1956, Ser. No. 608,344
20 Claims. (Cl. 234—13)

The present invention relates to apparatus for enabling equipment such as a modified adding machine to control other equipment, such as a card punching machine. More particularly, the invention is concerned with the modification of an adding machine and with the incorporation of additional components into an adding machine to enable it to control and operate a card punching machine. In this way, the key punch operates automatically to punch information cards in accordance with information set up in the adding machine.

Substantial progress has been made in recent years in the mechanization of general accounting routines and of other office matters of a routine nature. Various types of automatic and semi-automatic accounting machines have been devised and built for this purpose. Also and even more recently, electronic techniques have been applied, and many types of data processing systems and apparatus have been designed and constructed for use in this field. These data processing systems have been successfully used, for example, to control credit records in banks, to control inventories in department stores and to perform relatively complex operations and routines in other fields.

One general type of data processing system makes use of a multiplicity of information cards. These cards are each divided into a plurality of fields, with each field incorporating a number of columns that may change from field to field. Each column has a plurality of numbers disposed at spaced positions in the column in a similar pattern for each column. Particular numbers are punched in the different columns of each field in accordance with different patterns corresponding to the data that is to be recorded on them. This punching is usually carried out by a key punch machine which is equipped with a suitable key board. The prior art practice was for an operator to operate the keyboard manually as blank cards were passed through the key punch machine. The operator in operating the key board determined the patterns in which holes were to be formed in the different columns of each card, in accordance with the data to be stored.

In the present invention, apparatus such as a conventional adding machine is modified and changed so that, in addition to performing its usual functions, it may also be used to control automatically a card punching machine of the type described above. The invention enables an operator to control a key punch machine automatically in accordance with sets of data successively set up by the keyboard of the adding machine. In this manner, the blank cards passing through the key punch are punched in successive patterns representative of such sets of data.

The adding machines now in use generally operate in a manner such that each of a series of numbers to be arithmetically combined as by adding is first stored in a suitable memory unit. This storing is carried out as the operator sets up each such number by actuating the various keys of the keyboard. After a number has been set up and stored in the memory unit, the operator presses the "add" bar of the machine when the numbers are to be added. This causes the stored number to be transferred to a series of individual racks and type bars and then to be printed. It also causes the number to be added to numbers previously set up in the machine and this is accomplished in a known totalizer mechanism. The memory unit is cleared upon the transfer of the number to the racks to enable the next succeeding number to be set up and stored.

When an adding machine is adapted to control a key punch machine in accordance with the invention, it is possible for the key punch to undergo its card punching cycle for any particular set of data when the "add" bar of the adding machine is depressed. At the same time, the operator can be setting up the next set of data in the memory unit of the adding machine. That is, the key punch machine can be undergoing a card punching cycle for one set of data simultaneously with the setting up of the next set by the operator on the keyboard of the adding machine. This feature speeds up the card punching process materially, and it allows the operator to record the desired data on the information cards on a substantially continuous basis rather than on an intermittent basis.

As noted in the preceding paragraph, when the operator presses the "add" bar of the adding machines now in use, the number previously set up in the memory unit is transferred to the racks and the memory is cleared for the next number. The racks assume different positions respectively corresponding to the various digits of the transferred number. The type bars are mechanically coupled to the racks, and the type bars also assume individual positions corresponding to the transferred number. The type bars are then tripped and the number is printed. The racks are then returned to their reference position to receive the next number from the memory unit. When the racks first assume their different positions corresponding to a particular number transferred to them from the memory unit, the memory unit and the keyboard are cleared to enable the next number to be set up.

In accordance with the present invention, the key punch mechanism is controlled by the racks of the adding machine. This control is a function of the different individual positions which the racks assume and which coincide with the particular data transferred to them. However, the type bars are not tripped nor are the racks returned to their reference position until the key punch has been actuated. The adding machine is now in a condition to allow the next number to be set up in the memory unit. The next number may, therefore, be set up while the mechanism still is waiting for a signal from the key punch to indicate that the previous number has been utilized. When this signal is received, the racks are returned to their reference position to receive this next number from the memory unit. This enables essentially continuous, rather than intermittent, operation to be realized, as previously pointed out. It also provides a degree of flexibility and allows the operator to proceed and even get a little ahead of the key punch machine at times without interfering with the proper operation of the key punch machine. The operator need not be concerned as to whether the key punch machine is ahead or behind. The reason for this is that whenever the keyboard of the adding machine is released, it is appropriate to set up the next number in the memory unit.

Another feature of the invention is the fact that whenever a number is erroneously set up in the memory unit of the adding machine, the usual "clear" bar of the adding machine can be used to correct the number. That is, the erroneous number may be cleared and replaced by the correct number before the "add" bar is actuated to feed the erroneous number to the key punch machine.

The correction is made, therefore, before the erroneous number is recorded and punched on an information card. Thus, corrections can be made before the card is improperly punched. This makes it unnecessary to discard a card and all its previous correctly recorded data because of one erroneous number.

The apparatus of the invention is advantageous in that it automatically causes a "0" to be punched on each card by the key punch machine whenever the number of columns "typed" on the adding machine is less than the number of columns in the corresponding field of the card being processed at the key punch machine. This means that there are no blanks or spaces on the cards punched in accordance with the present invention so that each column of every field contains sensible information.

The present invention includes a modification to a conventional adding machine. This modification entails the mounting of resilient, electrically conductive brushes on the racks of the adding machine. A commutator is then brought into contact with the brushes after these racks have been established in individual positions corresponding to the data transferred to them from the memory unit. The commutator produces electrical signals representative of the individual positions of the racks. The signals, therefore, represent electrically the particular data transferred to the racks. The signals cause the key punch machine to record on the information cards the data which is related to the particular data represented by the individual positions of the racks. The data so recorded on the information cards is used in known manner in data processing systems.

It should be noted that the apparatus of the invention is so constructed that the commutator engages the brushes after the racks have assumed their individual positions. This obviates any moment of the relatively fragile brushes across the face of the commutator. Such movement of the commutator across the brushes might otherwise tend to damage the brushes.

In the drawings:

FIGURE 1 is a fragmentary perspective view somewhat schematically illustrating an adding machine and a key punch machine intercoupled in accordance with the present invention so that information can be fed from the former to the latter;

FIGURES 3 and 4 are fragmentary schematic representations of a typical mechanical memory unit used in present day adding machines and illustrating schematically the relationship between the memory unit and one of the racks and keys of the adding machine;

FIGURES 6 and 7 are enlarged exploded perspective views of certain of the various additional components incorporated into the adding machine for the purpose of the present invention;

FIGURE 9 is an enlarged fragmentary side elevational view showing a resilient electrically conductive brush mounted in accordance with the invention on one of the racks of the adding machine;

FIGURE 10 is an enlarged fragmentary side elevational view somewhat similar to that shown in FIGURE 9 and illustrates a pair of the resilient conductive brushes in electrical contact with a commutator, the commutator also being incorporated into the adding machine for purposes of the invention;

FIGURE 11 is a view substantially on the line 11—11 of FIGURE 9 and shows a bank of contacts and connecting springs for the resilient conductive brushes referred to above;

FIGURE 12 is a view substantially on the line 12—12 of FIGURE 9 and showing the face of the commutator mentioned above;

FIGURE 14 is a fragmentary side elevational view, like that of FIGURE 5, and showing the mechanism of the invention in a second position in its operating cycle;

FIGURE 16 shows a fourth position of the operating cycle of the mechanism previously shown in FIGURES 5, 14 and 15;

Figure 2:
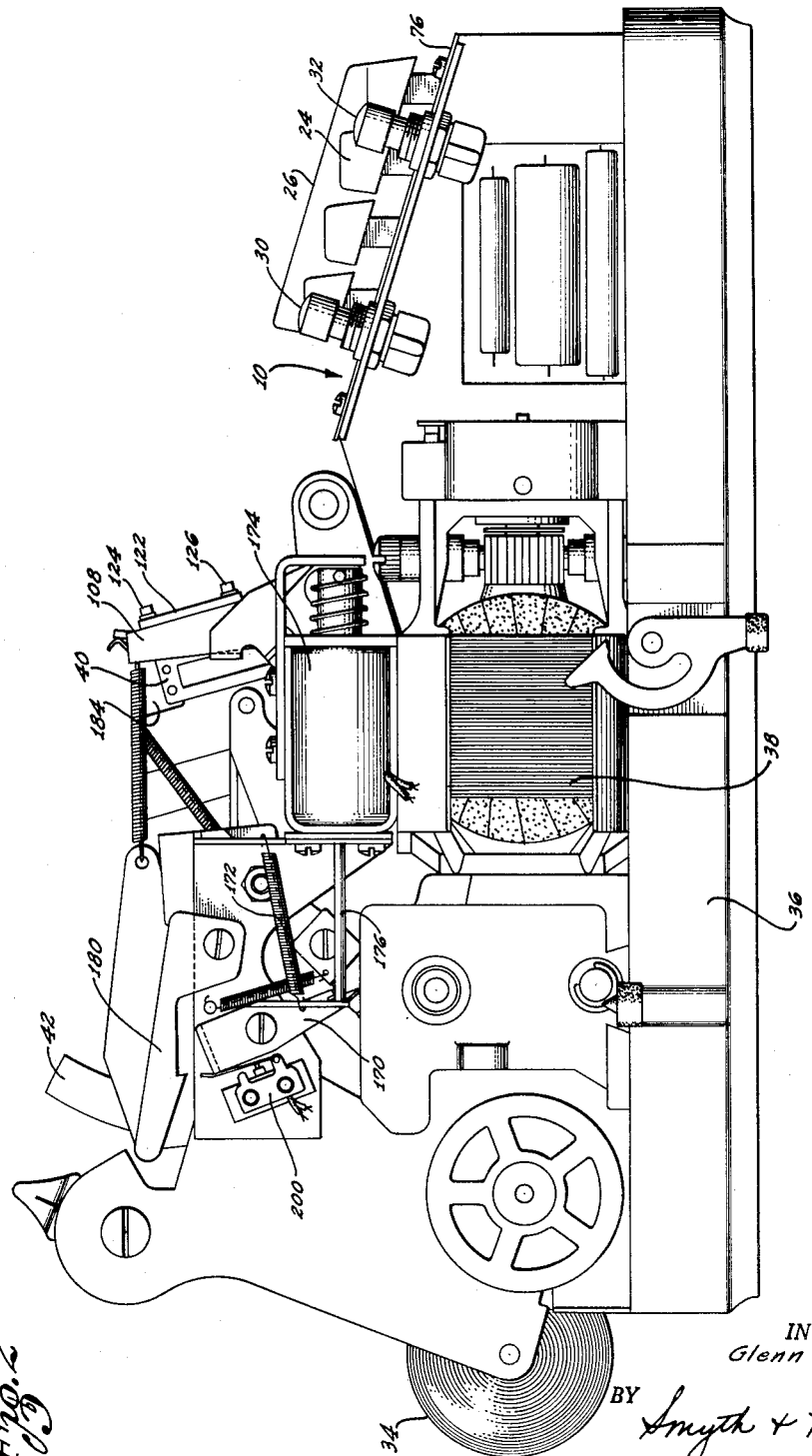
FIGURE 2 is a side elevational view of an adding machine of typical present day construction and including additional components which cooperate with the elements of the adding machine and with one another to adapt the adding machine to the purposes of the invention.

FIGURE 17 is a circuit diagram somewhat schematically illustrating the electrical features of the invention and the means by which the modified adding machine of the invention controls the operation of a typical key punch machine; and FIGURE 18 is a fragmentary view, enlarged in comparison to the other views, of a card on which information is punched by the key punch machine in accordance with the transfer of information to the key punch machine from the adding machine.

The particular embodiment of the invention shown and disclosed comprises, for example, a Monroe model "611" electric adding machine that is modified in accordance with the invention. The adding machine is adapted to be coupled to an International Business Machines key punch machine such as one of the types which are presently designated by that company as "024." Since the adding machine to be described and the key punch machine are known pieces of equipment, it is believed that their construction and operation need not be described in specific detail. For that reason, only schematic representations of certain features of these machines have been shown in the drawings. Also, the construction and operation of these machines will be discussed only in a limited sense and merely to provide a background for a full description of the invention itself. It should be appreciated that other models of the Monroe and I.B.M. machines can be used. For example, models "016," "026" and "031" of the I.B.M. key punches can also be used. The construction and operation of key punches suitable for use in this invention are fully disclosed in Read Patent 1,962,750; Lee Patent 1,976,618; Von Pein Patent 2,217,209; and Johnson Patent 2,684,719. The invention can also be adapted to operate with other models than Monroe and I.B.M. machines.

As shown in FIGURE 1, an adding machine 10 modified in accordance with the invention may be conveniently positioned on a supporting desk or table 12. The adding machine is electrically connected to a card punching machine 14 of the key punch type. This connection, for example, may be made over a pair of electrical cables 16 and 18. These cables are connected to the key punch mechanism through appropriate plug and socket assemblies 20 and 22. The particular electrical connections which are made through the cables will be described in detail.

The modified adding machine of the invention includes a usual keyboard 24. The keyboard has keys labelled "0" to "9," inclusive, and any desired number can be set up by successively depressing the appropriate keys. The first key to be depressed represents the digit of greatest numerical significance in the number, and each succeeding key to be depressed represents the digits of the number in decreasing ordinal significance. The adding machine may be constructed to handle, for example, numbers having up to ten digits.

The keyboard 24 also includes an "add" bar 26 and a "clear" bar 28. Appropriate electric push button switches 30 and 32 are mounted adjacent the keyboard. These latter switches are connected in the key punch 14 through the cable 18. They are connected in parallel with corresponding push-button switches at the key punch and enable certain usual key punch operations to be controlled from the adding machine. For example, the switch 30 may control the release of cards by the key punch, and the switch 32 may control card duplications at the key punch. The switch 30 may be connected to a particular switch in schematic 228001P indicating the electrical wiring diagram of the type 024 I.B.M. key punch. The particular switch in schematic 228001P is designated as the "release key" and is connected between terminals 65 and 76 in that schematic. Similarly, the switch 32 may be connected to the switch designated the "dup key" in schematic 228001P. This "dup key" is connected between terminals 45 and 46 in the I.B.M. schematic. The switch 30 can also be considered as equivalent to the contacts 190 which are shown in FIGURE 9 and which are described in the second column of page 8 in the specification of Von Pein Patent 2,217,209. This is clearly set forth in lines 44 to 50, inclusive, of the second column of page 8 of the Von Pein specification. The switch 32 can be considered as equivalent to the contacts 91 which are shown in FIGURE 9 and described in the first column of page 8 in the Von Pein specification. The adding machine also includes a roll of paper 34. The paper is drawn through the machine by a well known mechanism. This enables the various sets of data or numbers that are to be added in the machine to be imprinted in columnar form on the paper.

The modified adding and control machine of the invention is shown in more detail in FIGURE 2. The machine includes a base 36 which supports the various operating components. A drive motor 38 is mounted on the base, and this motor is controlled in a manner to be described to actuate the various operating components of the modified machine. The machine includes a suitable mechanical memory unit which is hidden in FIGURE 2, and which is actuated by the keyboard 24. This unit and the manner in which it is actuated are well known and understood in the adding machine art.

In a typical adding machine installation, a series of essentially vertical racks, such as the rack 40, are shifted along respective rectilinear paths for each number to be established in respective individual operating positions. These positions correspond respectively to the data set up in the memory unit by the actuated keys of the keyboard. These racks are mechanically coupled to corresponding series of type bars, such as the type bar 42, through suitable linkages. These type bars also assume respective individual positions corresponding to the respective positions of the racks.

As shown schematically in FIGURES 3 and 4, the memory unit of the adding machine includes a carriage 44. The carriage is movable along a path perpendicular to the plane of the drawing. The carriage has a plurality of columns of transversely slidable stops 46, and these stops are respectively engaged by the various keys of the keyboard 24. One column of the stops 46 is illustrated in FIGURES 3 and 4. The arrangement is such that each key of the keyboard is adapted to engage a different stop in each of the columns. When the memory unit is first conditioned to receive data, it is moved to a lower limiting position with respect to the plane of the drawing. Each time a key of the keyboard 24 is depressed, the carriage moves one position up out of the plane of the drawing to present a new column of stops to the keys of the keyboard. The depression of any particular key 46a causes the stop 24a in that column associated with that key to be moved to the left of the drawing, as shown in FIGURE 4. Therefore, as the keys of the keyboard 24 are manipulated, a particular number is set up and stored in the memory unit. Each digit of this number is represented by the displacement of a corresponding stop in each column to the left of the drawing. The column of stops corresponding to the first position of the carriage represents the digit of greatest numerical significance in the number being set up, and the succeeding columns of stops represent the digits of decreasing significance.

After a certain number is set and stored in the memory unit 44, the add bar 26 is actuated. This causes the racks such as the rack 40 to move downwardly. These racks correspond in number to the number of columns of stops in the memory unit 44. Each rack includes a spring loaded lug 48, and each rack is moved downwardly until its lug engages the stop in the corresponding column that has been moved to the left by the actuated key of the keyboard. In this manner, for example, each rack may assume a particular position corresponding to any one of a number of digits from 0 to 9. Likewise, the various racks are made to represent digits of increasing ordinal significance and corresponding to the number stored in the memory unit. The various individual positions of the racks such as the rack 40 therefore, represent the number stored in the memory unit.

As previously noted, the racks such as the rack 40 are mechanically coupled to a series of type bars such as the type bar 42 (FIGURE 2). These type bars are actuated and moved by the racks so that they may bring numbers corresponding to the digits represented by the respective positions of the racks into a typing position. These bars are then tripped so that the number corresponding to that set up in the memory unit, and represented by the various positions of the racks, may be typed on the paper 34 (FIGURES 1 and 2).

The racks such as the rack 40 are now moved back to their reference position. In so moving, they are rocked forward into engagement with respective pinions such as the pinion 50 (FIGURES 3 and 4). The pinions such as the pinion 50 engage teeth such as the teeth 52 formed on the various racks. The pinions such as the pinion 50 engage further pinions such as the pinion 54, which, in turn, actuate the totalizer of the adding machine. In this manner, the number just typed on the paper 34 is totalized with preceding numbers set up and typed in columnar form by the machine on the paper. This totalizing continues until all the numbers to be added have been typed on the paper 34. The actuation of a suitable totalizer bar then causes the totalized amount to be typed on the paper 34. This is carried out in a manner well understood in the adding machine art.

It should be noted that actuation of the add bar 26 energizes the motor 38 and couples it to a control mechanism. This control mechanism performs in the proper sequence the operations discussed above that is, it causes the data to be transferred from the memory unit 44 to the racks such as the rack 40; it causes the type bars such as the bar 42 to be tripped; and it is instrumental in causing the type bars to be retracted and for returning the racks to their reference position. An important feature insofar as the present invention is concerned is that this control mechanism causes the memory unit 44 to be shifted back to its initial position, with all the stops such as the stop 46 returned to their original position, at an appropriate intermediate point in the cycle of operations. That is, the control mechanism clears the data from the memory unit and conditions the memory unit to receive subsequent data from the keyboard before the cycle is completed. This takes place when the first set of data is transferred to the racks, but before it is actually printed by the type bars. The advantage of this sequence to the present invention will become apparent as the description proceeds. The add bar 26 and the keyboard 24, in accordance with usual adding machine principles, are locked until the memory unit has been so cleared.

Figure 5:
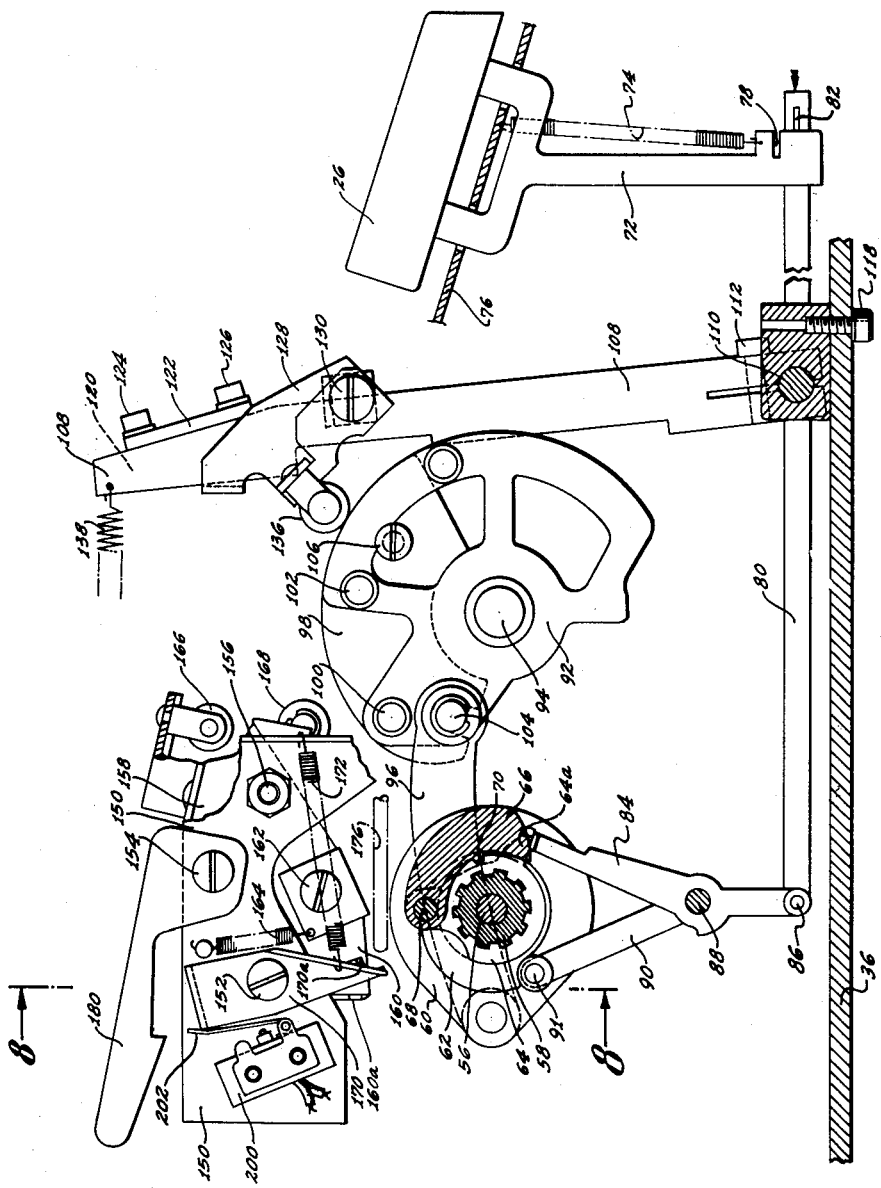
FIGURE 5 is an enlarged partly sectional, fragmentary elevational view of FIGURE 2, illustrating various components of the adding machine in their "home" positions and further illustrating various additional components incorporated into the adding machine to enable it to perform the function and purpose of the present invention.
Figure 8:
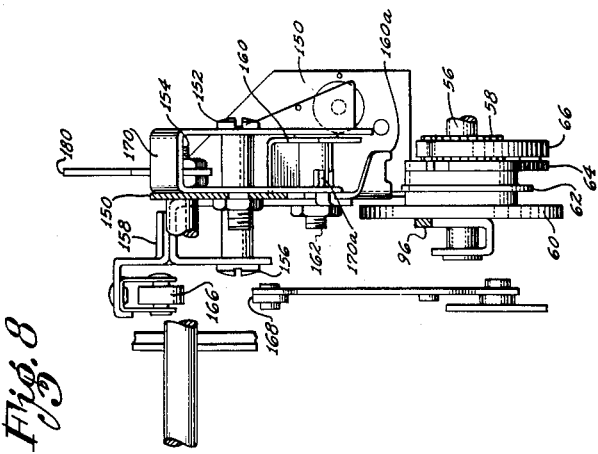
FIGURE 8 is a fragmentary end view substantially on the line 8—8 of FIGURE 5 and illustrating certain cams and cam followers utilized in carrying out the invention and also illustrating a solenoid-actuated latch mechanism which is incorporated for accomplishing the purpose of the invention.

As clearly shown in FIGURES 5 and 8, the motor 38 has a drive shaft 56, and a ratchet wheel 58 is fixedly mounted on the drive shaft. An eccentric disc 60 is rotatably mounted on the drive shaft 56. A second disc 62 is also rotatably mounted on the drive shaft. The second disc may be formed integral with the disc 60. The periphery of the disc 62 defines a cam surface of a predetermined configuration. A third disc 64 is also rotatably mounted on the drive shaft 56. The third disc 64 is coupled to the disc 62 in a manner to permit limited relative rotation between the two discs. Moreover, spring biasing means (not shown) is provided between these discs. This means normally biases the disc 64 in a clockwise direction relative to the disc 62. The disc 64 has a radial projection 64a formed therein. Also, this disc 64 pivotally mounts a pawl 66 by means, for example, of a pivot pin 68. The pawl 66 has a tooth 70 which is adapted to engage the ratchet wheel 58 when the disc 64 is released. However, when the disc 64 is moved in a counter-clockwise direction relative to the disc 62 against the spring bias, the latter disc engages the pawl to disengage its tooth 70 from the ratchet wheel.

The add bar 26 has a downwardly extending arm 72. A resilient spring 74 is connected to the lower portion of the arm 72 and to the frame of the keyboard which is designated 76. This spring biases the add bar upwardly. The arm 72 has a horizontal slot 78 formed near its lower end. A horizontal bar 80 is slidably supported in the adding machine, and this bar is spring biased to the left of FIGURE 5 by a suitable spring (not shown). The bar 80 has a transverse member 82 (FIGURE 5), and this member engages the slot 78 in the arm 72 when the add bar is moved to its lower position. In this manner, the depression of the add bar 26 causes the arm 80 to move to the left of FIGURE 5 by allowing its transverse member 82 to enter the slot 78. Moreover, entrance of the member 82 into the slot 78 holds the add bar in its actuated position. This locks the add bar until the member 82 is moved to the right of the drawing. The keyboard 24 in known manner is also locked when the add bar is locked.

The end of the bar 80 remote from the arm 72 is pivotally mounted to one end of a lever 84 by means, for example, of a pivot pin 86. The lever 84 itself is pivotally mounted on a pin 88 and is movable between an engaging and a disengaging position. The free end of the lever 84 engages the stop 64a of the disc 64 when the lever is in its engaging position as illustrated in FIGURE 5. This engagement rotatably shifts the spring biased disc 64 with respect to the discs 60 and 62 in a counterclockwise direction. The pawl 66 is, therefore, moved so that its tooth 70 is out of engagement with the ratchet wheel 58.

One end of an arm 90 is rotatably mounted on the pin 88, and this arm is spring biased in a clockwise direction about the pin by a suitable biasing spring (not shown). A cam follower 91 is rotatably mounted on the free end of the arm 80. This cam follower rides on the cam surface of the disc 62.

The components described in the preceding paragraphs are standard in a conventional adding machine. The adding machine also includes a cam 92 as a standard component, and this cam is rotatably mounted on a shaft 94. The eccentric disc 60 is coupled to the cam 92 in a pitman linkage arrangement and by means of a connecting link 96.

When the add bar 26 is actuated, the bar 80 moves to the left of FIGURE 5 to move the lever 84 out of engagement with the pawl 66. This causes the pawl tooth 70 to engage the ratchet wheel 58. This actuation of the add bar also energizes the motor 38 so that the shaft 56 and the ratchet wheel 58 rotate. The engagement of the pawl tooth 70 with the wheel 58 causes this rotational motion to be transmitted to the eccentric disc 60. Rotation of the eccentric disc 60 imparts a rocking motion to the cam 92 about its shaft 94. This motion of the cam 92 performs, in the desired sequence, the control of the racks and type bars described previously. That is, the cam 92 is rotated first in a clockwise direction to transfer the data from the memory unit 44 to the racks and to cause the type bars to be controlled and moved to their typing position. Then the cam 92 is moved in the opposite direction to return the type bars and the racks to their reference positions. Before the disc 60 has completed a full cycle, the memory unit 44 is cleared (as previously noted), and the bar 80 is shifted to the right of FIGURE 5 by a usual adding machine control mechanism. This shifting of the bar 80 moves the lever 84 back to its engaging position. This shifting of the bar 80 also releases the add bar and frees it and the keyboard 24.

After the disc 60 has completed a full cycle, the projection 64a engages the lever 84 to produce counter-clockwise rotation of the disc 64 with respect to the disc 62. This disengages the tooth 70 of the pawl 66 from the ratchet wheel 58 and restores the apparatus to the condition illustrated in FIGURE 5. Also, this engagement of the lever 84 and the projection 64a causes the motor 38 to be de-energized by a known de-energizing control arrangement. During the operational cycle described above, the cam follower 92 on the arm 90 moves around the peripheral cam surface of the disc 62. This cam surface has a configuration such that the arm 90 snaps into place as the tooth 64a engages the end of the lever 84. This arrangement effectively prevents backlash in the system.

In accordance with the present invention, an additional segment 98 is added to the cam 92. This segment has a pair of apertures which engage a pair of positioning studs 100 and 102 extending through the cam 92. The segment 98 also has a slotted portion which engages a pin 104 which pivotally mounts the link 96 to the cam. The segment 98 is secured to the cam by means of a screw 106. The segment 98 serves to extend the peripheral surface of the cam 92 along a uniform arcuate path.

An arm 108 is rigidly mounted on a shaft 110. The shaft extends through a bifurcated end portion of the arm, and the end portion is drawn tightly around the shaft by means, for example, of a screw 112. The shaft 110 is rotatably mounted at its opposite ends in a pair of brackets 114 and 116 (FIGURE 7). These brackets are secured to the base 36 by means, for example, of a pair of set screws such as the screw 118. A commutator 120 is mounted on the free end of the arm 108 by means of a bracket 122. This bracket may be riveted or otherwise attached to the surface of the commutator, and the bracket is mounted on the arm 108 by means of a pair of set screws 124 and 126.

A bracket 128 is pivotally mounted on the arm 108 adjacent the commutator 120. This mounting is accomplished by means, for example, of a screw 130 extending through the bracket and through an appropriately formed portion 132 (FIGURE 7) of the arm 108. The screw is held in place by means of a nut 134. A cam follower 136 is rotatably mounted in the bracket 128 and this cam follower is adapted to engage the peripheral surface of the cam 92 and of the added cam segment 98. The arm 108 is biased in a counter-clockwise direction by means of a spring 138, and the reciprocal rotational movement of the cam 92 causes the cam follower 136 to ride on its peripheral surface and rock the arm 108 about the axis of its shaft 110 in a manner to be described.

Figure 13:
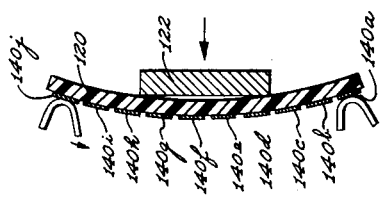
FIGURE 13 is a sectional view of the commutator substantially on the line 13—13 of FIGURE 12.

The commutator 120 is shown in detail in FIGURES 12 and 13, and it may be composed, for example, of a spun glass laminate. The commutator has a series of conductive strips 140a–140j fused to its front surface. These conductive strips may be formed, for example, of platinum or other conductive substance. The conductive strips extend horizontally across the surface of the commutator in spaced parallel relationship and they are insulated from one another. The strips have corresponding terminals 141a–141j, and these terminals extend through to the back of the commutator 120.

In accordance with the invention, a latch mechanism is also incorporated in the adding machine. This latch mechanism includes a mounting bracket 150 (FIGURES 5 and 6), and this bracket is secured to the frame of the adding machine by means of screws 152, and 154 and 156. The screw 156 also serves pivotally to mount an arm assembly 158, 160 on the bracket 150. The two pieces 158, 160 of the arm assembly are pivotally joined by means of a screw 162 effectively to form a knee joint for the assembly. A spring 164 is secured to the bracket 150 and to the piece 160 of the arm assembly. This spring biases the arm assembly in a clockwise direction about the axis of the screw 156.

The piece 158 of the arm assembly has a roller member 166 rotatably mounted to its upper end. This roller is engaged by a second roller 168 included in the conventional adding machine mechanism. The roller 168 is moved up against the roller 166 upon rotation of the cam 92 to pivot the arm assembly 158, 160 about the screw 162 in a manner to be described.

The screw 152 also serves pivotally to mount a latch 170 on the bracket 150. A spring 172 is secured to the bracket 150 and to the latch 170 to bias the latch in a counter-clockwise direction. A solenoid 174 (FIGURE 2) is mounted on the frame of the adding machine adjacent the top of the motor 38. The solenoid has an armature 176 which engages the latch 170 when the solenoid is energized.

When the roller 168 engages the roller 166, the arm assembly 158 and 160 is moved in a counter-clockwise direction against the biasing action of the spring 164 into latching engagement with the latch 170. In this latched condition of the arm assembly, a lug 170a of the latch 170 engages the top edge of the piece 160 of the arm assembly. This holds the arm assembly in a latched condition after the roller 168 is withdrawn. When the solenoid 174 (FIGURE 2) is energized, its armature 176 moves to the left in FIGURES 2 and 5 to engage the latch 170. The armature 176 moves the latch 170 in a clockwise direction against the bias of the spring 172 to release the arm assembly 150 and 160. This allows the spring 164 to draw the arm assembly back to the unlatched position shown in FIGURE 5.

When the arm assembly 158 and 160 is in its latched condition, the end 160a (FIGURE 8) of the piece 160 is positioned to engage the projection 64a of the disc 64 as the disc is rotated. Such engagement causes the disc 64 to rotate in a counter-clockwise direction with respect to the disc 62. This in turn causes the pawl 66 to disengage its tooth 70 from the ratchet wheel 58. This latter disengagement effectively decouples the cam 92 from the drive shaft 56 of the drive motor 38 and arrests the cam at a particular angular position.

The screw 154 also serves pivotally to mount a manually operable lever 180 on the bracket 150. When the lever is moved to its down position, it engages the latch 170 and holds the latch in a position free from the arm assembly 158 and 160. When the latch is so held, it is unable to engage the arm assembly so as to position the piece 160 to decouple the pawl 66. When the lever is in its down position, therefore, the adding machine may be used to perform its normal conventional functions. Then, when it is desired to adapt the adding machine to the present invention, it is merely necessary to move the lever 180 manually up and out of engagement with the latch 170.

Further in accordance with the invention, each of the racks such as the rack 40 has a resilient electrically conductive brush mounted on its top end. This may be achieved, for example, in the manner shown in FIGURES 9 and 10. A small metallic tab 182 is welded to the upper end of the rack 40, and the tab has a small sheet 184 of insulating substance riveted to it by means, for example, of rivets 186 and 188. A resilient brush 190 is glued along the top edge of the insulating sheet 184. The insulator 184 may be composed, for example, of mica.

Each resilient brush 190 is in the form of a cat-whisker and is composed of resilient electrically conductive material such as platinum. Each brush 190 has a hook-shaped end to the left of FIGURE 9 to receive a resilient, coiled, spring-like connector 192. The right end portion 190a of each brush 190 is bent into the illustrated configuration. This configuration enables the brush to be electrically engaged by a conductive strip of the commutator 120 when the commutator is rocked into its forward position. Two brushes 190 and their associated racks 40 and connectors 192 are shown in FIGURE 10.

A bracket 201 (FIGURE 11) is secured to the frame 36 of the adding machine. This bracket includes an insulating strip 203, and a series of terminals 204a–204j are mounted in spaced mutually insulated relation across this strip. Each of the resilient spring-like connectors, such as the connector 192, has its end remote from its corresponding brush connected to an associated terminal 204a–204j in the manner shown in FIGURE 11. The various connectors, such as the connector 192, are separated by a series of spaced, parallel, insulating strips 206a–206j. The strips are affixed to the insulating strip 203 and extend upwardly from this strip.

A switch 200 is mounted on the bracket 150. This switch may be of the type manufactured by the Minneapolis Honeywell Corporation of Minneapolis, Minn., and designated by them as "Microswitch." The switch has an actuating arm 202 which is spring biased into contact with the latch 170. When the latch 170 is in the position shown in FIGURE 5, the arm 202 is not in contact with the actuating plunger of the switch 200 and the switch is open. However, when the latch 170 engages the arm assembly 158, 160, the arm 202 is moved by the latch against the plunger of the switch 200 to close the switch.

Whenever a set of data is transferred from the memory unit 44 (FIGURES 3 and 4) to the racks such as the rack 40 and whenever these racks assume respective individual positions corresponding to such data, the brushes such as the brush 190 are moved with their associated racks to different respective positions with respect to the commutator 120. Then, when the commutator is brought into a contacting position with these brushes, they contact respective ones of the conductive strips 140a–140j of the commutator. Therefore, selective connections are made between the terminals 204a–204j and the terminals 141a–141j on the commutator 120. The brushes such as the brush 190 and the commutator 120 may be considered as one type of transducing means since they convert mechanical displacements into electrical signals. It will be appreciated that other types of transducing means may also be used.

The representation of FIGURE 5 shows the adding machine mechanism in its "home" position and the additional components of the invention in their "rest" position. In FIGURE 5, the lever 180 is moved to its "up" position to enable the adding machine to be operated in accordance with the invention. Now, when the first set of data is set up in the memory unit 44 by the keyboard 24 in the manner explained, and when the add bar 26 is depressed, the following sequence of events occurs: The motor 38 is energized to drive the shaft 56 and the ratchet wheel 58; the arm 84 is shifted in a clockwise direction away from the projection 64a of the disc 64 and the pawl tooth 70 engages the ratchet wheel 58. This causes the cam 92 first to rotate in a clockwise direction to transfer the data from the memory unit 44 to the racks such as the rack 40 in accordance with normal adding machine operation. The racks now assume their respective individual position as do their associated brushes such as the brush 190.

During the initial rotational movement of the cam 92 in the clockwise direction, the cam follower 136 follows a generally circular dwell portion of the peripheral surface of the cam 92 and of the added segment 98. The arm 108 therefore, remains in its position illustrated in FIGURE 5, and the commutator 120 remains out of contact with the brushes, such as the brush 190. The mechanism now moves from its position of FIGURE 5 to its position of FIGURE 14. In the latter position, the arm 108 is still in its original position of FIGURE 5 and the roller 168 has not yet moved into engagement with the roller 166. Therefore, the arm assembly 158, 160 is still not moved to its latched position.

Figure 15:
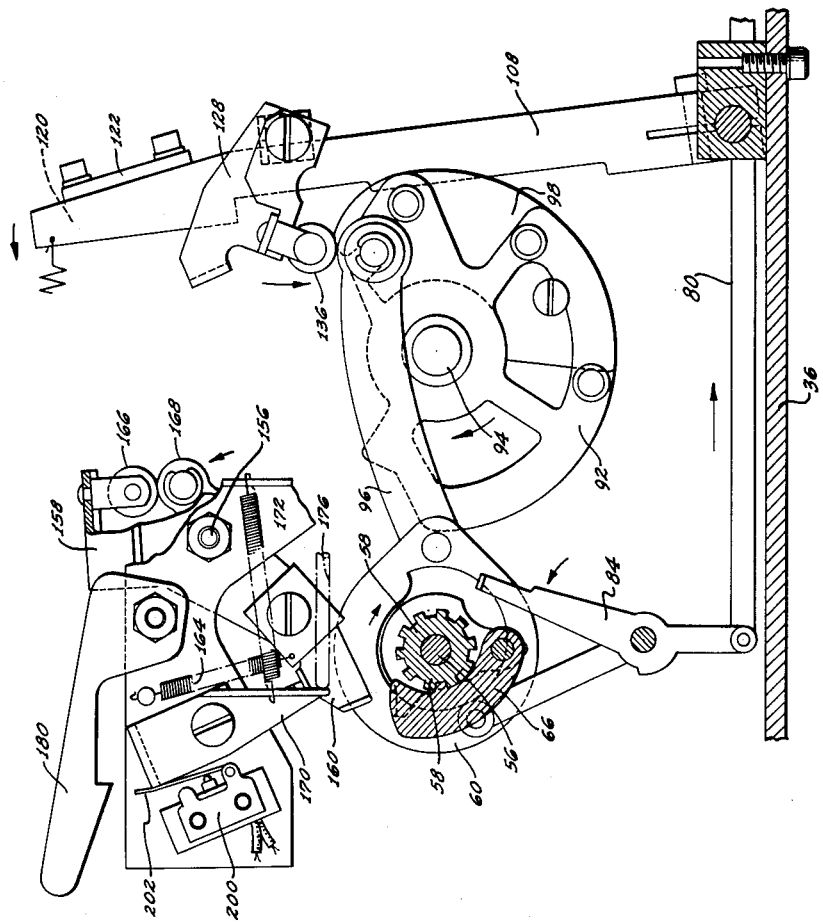
FIGURE 15 is another fragmentary side elevational view of the mechanism shown in FIGURES 5 and 14 and illustrates the mechanism in a third position in its operating cycle.

The mechanism now moves to its position shown in FIGURE 15. The cam follower 136 in this latter position has reached the end of the circular portion of the peripheral surface of the cam segment 98, and the follower moves along a path extending radially inwardly towards the center of the cam 92. This motion causes the arm 108 to rock forward in a counter-clockwise direction to bring the conductive strips of the commutator 120 into contact with the brushes 190. Before this contact is made, however, the racks (such as the rack 40) are shifted in their respective individual positions corresponding to the data transferred to them from the memory unit 44. This assures that there will be no vertical movement of the delicate brushes as the commutator is brought into its contacting position with them. This is important because any such vertical motion would tend to damage the brushes.

Also, when the mechanism moves from its condition of FIGURE 14 to its condition of FIGURE 15, and the set of data having been transferred from the memory unit 44 to the racks, the memory unit is now cleared and returned to its original position. The bar 80 is also moved to the right of FIGURE 5 to release the add bar 26 and the keyboard 24. This enables the next set of information to be stored in the memory unit at this point in the operating cycle. Also, the arm 84 is now moved to its original position to enable it to declutch the pawl 66 when the mechanism is finally returned to its "home" condition of FIGURE 5. This clearing of the memory unit and keyboard at an intermediate point in the operational cycle, as previously noted, imparts a degree of flexibility to the system and allows the operator to set up the next set of data while the preceding set is still being processed.

When the mechanism enters the condition shown in FIGURE 15, the roller 168 has moved up and into engagement with the roller 166. This engagement of the rollers pivots the arm assembly 158 and 160 in a counter-clockwise direction against the bias of the spring 164, and the arm assembly is latched by the latch 170 in the manner described. This latching by the latch 170 also moves the arm 202 down on the plunger of the switch 200 to close the switch.

Subsequent rotation of the eccentric disc 60 to the position shown in FIGURE 16 causes the rotation of the cam 92 to be reversed, this being due to the coupling action of the link 96. The cam is now rotated slightly in its counter-clockwise direction, and this causes the roller 168 to move away from the roller 166. However, the arm assembly 158 and 160 remains in its latched condition due to the action of the latch 170. With the arm assembly in its latched position, the end 160a of its piece 160 engages the projection 64a of the disc 64 as the mechanism moves to the position of FIGURE 16. This engagement causes the disc 64 to rotate relative to the disc 62 causing pawl 66 to move and disengage its tooth 70 from the ratchet wheel 58. The discs 60, 62, and 64 are thereby disengaged from the rotating drive shaft 56, and the counter-clockwise rotation of the cam 92 is arrested. The arresting of the cam 92 occurs at a position in which the conductive strips of the commutator 120 are still in electrical contact with the resilient brushes, such as the brush 190. Therefore, selective connections are maintained between the terminals 204a–204j and the terminals 141a–141j corresponding to the positions of the racks, such as the rack 40. That is, output signals are developed at the commutator terminals 141a–141j corresponding to the data transferred from the memory unit 44 to the racks.

After the utilization of the output signals from the commutator terminals 141a–141j, the solenoid 174 is energized and its armature 176 is moved against the latch 170 to release the arm assembly 158, 160 and open the switch 200. The end 160a of the piece 160 is now moved out of engagement with the projection 64a of the disc 64. This causes the disc 64 to rotate with respect to the disc 62 and the tooth 70 of the pawl 66 to re-engage the ratchet wheel 58. The disc 60, therefore, is again rotated and drives the cam 92 in a counter-clockwise direction. The mechanism now returns to its "home" position of FIGURE 5, and the pawl 66 is disengaged by the engagement of the arm 84 with the stop 64a. This arrests the rotation of the cam 92 and causes the motor 38 to be deenergized.

While the mechanism is moving from its position of FIGURE 16 back to its "home" position of FIGURE 5, and by normal adding machine action, the type bars (such as the type bar 42) are brought down into typing engagement with the paper 34 to record the particular number being processed, and the racks (such as the rack 40) and the type bars are then returned to their reference position.

An electric control system for utilizing the output signals from the commutator terminals 141a–141j to control the key punch mechanism 114 is illustrated in FIGURE 17. The control system of FIGURE 17 includes a stepping switch 300 having a first section 300a, a second section 300b and a third section 300c. Each section of the stepping switch 300 includes, for example, eleven fixed contacts of which one is neutral. The stepping switch 300 may be purchased from the C. P. Clare Company and is designated as Type DS–12 by that company. The stepping switch 300 is controlled by a stepping relay winding 300d. This control is such that whenever the winding 300d is energized, the stepping switch is moved to a cocked position and when the winding is subsequently deenergized, the movable arms of the stepping switch move from one contact to the next. The stepping switch 300 is constructed in known manner to have a plurality of movable arms for each of its sections, the construction being such that when one of the arms in any section passes from the number 10 contact of that section, the next arm moves into engagement with the neutral contact of that section. This known construction obviates the necessity of providing a means for returning the switch to its neutral position.

The relay winding 300d also controls a set of contacts 300e, and it moves a movable contact "c" in this set from a normally closed position with a fixed contact "a" to engage a fixed contact "b" when the winding is energized. The stepping switch 300 also includes a contact 300f. This latter contact is mechanically controlled by the movable arms of the stepping switch to be closed at all times except when the switch is in its neutral position, that is, when the respective operative arms of the stepping switch are engaging the neutral contacts.

A capacitor 302 and a series resistor 304 are connected in shunt with the relay winding 300d to suppress arcing across the contacts associated with this winding. A variable resistor 306 and a series diode 308 are also connected across the relay winding 300d to suppress arcing of these contacts. These latter elements 306, 308 also serve to provide a time delay between the time when the winding 300d is deenergized and when the movable contact "c" moves to open the contact "a" and engage the contact "c." This time delay can be controlled by manually varying the value of the resistor 306.

The control system also includes a second stepping switch 310. The stepping switch 310 may also be purchased from the C. P. Clare Company. This second switch has two sections 310a and 310b, and each of these sections has, for example, 10 fixed contacts and a movable arm which is controlled sequentially to engage these contacts. The stepping switch 310 is controlled by a stepping relay winding 310c. The control is such that each time the winding 310c is energized, the arm of each section of stepping switch moves from one contact to the next. The stepping switch 310 also has a return relay winding 310d. Whenever this latter winding is energized, it returns the movable arms of the stepping switch 310 back into engagement with the first contact of the respective sections. This return occurs whenever the winding 310d is energized, and regardless of which particular contact in the switch 310 is being engaged by the movable arms at that particular time.

A damping diode 312 is connected across the stepping winding 310c to short-circuit the inductive voltage appearing across the winding when it is first deenergized. This diode connection helps to suppress arcing of the contacts controlled by the winding 310c. The diode 312 also provides a delay in the movement of these contacts after the stepping winding 310c is deenergized. Likewise, a diode 314 is connected in shunt with the return winding 310d for the same purpose. The stepping winding 310c controls a pair of normally closed contacts 310e. When the winding is energized, the movable contact "a" of this pair is moved out of engagement with the fixed contact "b." The stepping winding 310c also controls a pair of normally open contacts 310f, and when this winding is energized it causes the movable contact "a" of this pair to engage the fixed contact "b."

The control circuit includes a source of direct voltage 316. The negative terminal of this voltage source is connected to a point of reference potential or ground. The positive terminal of the source 316 is connected to one of the terminals of the return winding 310d, and to one of the contacts of the switch 200 described previously in conjunction with the adding machine. As described, this switch is so connected that it is closed by the latch 170 during the intervals when the arm assembly 158 and 160 is latched and when the commutator 120 engages the brushes (such as the brush 190) to develop output signals. The switch 200 is shunted by a capacitor 318 and a series resistor 320, these latter elements functioning to suppress arcing at the contacts of the switch.

The other terminal of the switch 200 is connected to one terminal of the solenoid 174 which was described previously in conjunction with the mechanical details of the adding machine. The solenoid 174 is shunted by a diode 322 which functions to provide a measure of time delay between the deenergization of the solenoid and the actual release of the armature 176. The other contact of the switch 200 is also connected to one terminal of the stepping winding 310c and to one terminal of the stepping winding 300d. This latter contact of the switch 200 is further connected to one terminal of a relay winding 324. The purpose of the relay 324 will be explained subsequently.

The fixed contacts 2–10 of the sections 310b of the stepping switch 310 are connected together, and these common contacts are all connected to the other terminal of the return winding 310d. Contact of the section 310b is open-circuited, and the movable arm of this section is connected to the anode of a diode 326. The cathode of this diode is connected to a terminal 328 which is adapted to be connected to a conventional terminal in the key punch mechanism 14. This key punch terminal is so controlled that it is established at ground potential after each individual card has been processed in the key punch. The terminal 328 is connected to the terminal 72 in I.B.M. schematic 228001P. The terminal 328 may be considered as equivalent to several different switches in Von Pein Patent 2,217,209. For example, the terminal 328 may be considered as equivalent to the switch arm 170 which is shown in FIGURE 1 and which is described at the bottom of page 8 and the top of page 9 of the specification in Von Pein Patent 2,217,209. This switch is closed when the card carriage is returned after a punching cycle so that operation on a new card can be initiated. Further description is made at the bottom of the first column on page 10 and the top of the second column of page 10 of the Von Pein specification as to the return of the card carriage from the last column to the first column and as to the disabling of any punching operations during the carriage return. Because of this, the terminal 328 may be considered as equivalent to the contacts 190 which are described at the bottom of the first column of page 10 and the middle of the second column of page 8 of the Von Pein specification.

The other terminal of the solenoid 174 is connected to the fixed "b" contact of the set of contacts 310f. The movable "a" contact of this set is connected to the neutral contact "n" of the switch section 300c. Contact 10 of this switch section is connected to the cathode of a diode 330, the anode of this diode being connected to the other terminal of the stepping winding 310c. This latter terminal of the winding 310c is also connected to the anode of a diode 332, and the cathode of this diode is connected to the other terminal of the solenoid 174. The movable arm of the switch section 300c is connected to ground. All the other fixed contacts 1–9 of the switch section 300c are left open.

The other terminal of the relay winding 300d is connected to the fixed contact "a" of the set of contacts 300e. The movable contact "c" of this set is connected to the fixed contact "b" of the set of contacts 310e. The movable contact "a" of the latter set of contacts is connected to a fixed contact "a" of a set of contacts 324a controlled by the relay winding 324. This latter set of contacts includes a movable contact "b" which is grounded and which is normally in engagement with a fixed contact "c." When the relay winding 324 is energized, it disengages the movable contact "b" of the set of contacts 324a from the fixed contact "c" and brings the movable contact into engagement with the fixed contact "a."

The fixed contact "b" of the set of contacts 300e is connected to the movable arm of the switch section 300b. The neutral contact of this switch section is open, as is the number 10 contact. The other contacts 1–9 of this switch section are connected to respective input terminals of a patch board 334 or equivalent switching device. The patch board 334 may be constructed in a manner similar to that described in co-pending application Serial No. 573,719, filed March 26, 1956, by me. Its purpose is to permit the manual connection of its input terminals to selected ones of its output terminals. These connections may be made by jumpers or any other suitable means. The number 10 switch contact of the section 310a is open circuited, but the contacts 1–9 of this switch section are connected to respective ones of the output terminals of the patch board 334. The movable arm of the switch section 310a is connected to the cathode of a diode 336. The anode of this diode is connected to one of the contacts of the switch 300f. The other contact of the switch 300f is connected to the other terminal of the relay winding 300d. It will be remembered that the switch 300f is mechanically coupled to the arms of the switch 300, and that the switch 300f opens whenever these arms move from the neutral contacts of the switch sections 300a, 300b and 300c.

The relay winding 324 is shunted by a capacitor 338. The lower terminal of the relay winding is connected to the anode of an electron discharge tube 340. This tube preferably is a pentode and may, for example, be of the type presently designated as a 25L6. The suppressor grid of the tube 340 is connected to its cathode, and these two electrodes are connected to ground. The screen grid of the tube is connected to its anode. The control grid of the tube is connected to a terminal 342. This terminal is connected to a terminal in the key punch mechanism 14 that is established at a negative bias potential at all times except at the beginning of each field of a card being processed. The terminal 342 is connected to the terminal 43 in the I.B.M. schematic 228001P. The terminal 43 is in turn connected to the switch designated as "dup 2" and also as "27–6" in the I.B.M. schematic. As will be seen from Von Pein Patent 2,217,209, a different integer punched in particular columns of each card provides a control as to different operations on the card. For example, card skipping in the Von Pein patent is controlled by the punching of a perforation in one horizontal row and card duplicating may be controlled by punching a hole in a different horizontal row. This is fully described in the Von Pein patent and is clearly shown in FIGURE 2 of that patent. By way of illustration, Von Pein describes that a skipping operation is initiated by the punching of a hole in the horiztontal row corresponding to the integer "11." This description occurs on lines 18 to 23, inclusive of the second column in page 4 of the Von Pein specification. Because of this, it is believed that a person skilled in the art would understand how the punching of a hole in the horizontal row corresponding to the integer "1" would control the initiation of a new field in applicant's invention.

In one well known type of key punch machine, a program card is used so that the machine may be controlled to designate the beginning of each field of each card being processed. This permits the data to be processed on a selected portion of the card, and also permits multiple sets of data to be punched in different fields on each card. At the start of each field and until the first digit of a set of data has been punched, the key punch mechanism maintains zero bias on the terminal 342. Therefore, if the switch 200 is closed at this time the tube 340 is rendered conductive to energize the relay winding 324. At all other times, however, the key punch mechanism maintains a negative bias on the terminal 342. This causes the tube 340 to be nonconductive so that the relay winding 324 cannot be energized even though the switch 200 may be closed.

One terminal of a relay winding 344 is connected to the contacts "*c*" of the set of contacts 324*a*. This relay winding is shunted by a capacitor 345, and this capacitor aids in suppressing arcing across the relay contacts. The other terminal of the relay winding 344 is connected to a resistor 346, and the resistor in turn is connected to a terminal 348. The terminal 348 is connected to a terminal in the key punch mechanism 14. This latter key punch terminal completes a connection to a positive unidirectional voltage for a short interval whenever the card in the key punch is in position to have a succeeding digit punched in it. That is, a positive voltage is impressed on the terminal 348 by the key punch for each digit to be punched and for a small portion of the punching cycle. The terminal 348 is connected to the terminal designated as $$\frac{M180°}{B0°}$$

in I.B.M. schematic 228001P. This terminal is connected to the "punch clutch" in the I.B.M. schematic. The operation of the card punching machine after each punching operation may be seen from the discussion in the first column of page 3 of the Lee Patent 2,976,618. As will be seen from this discussion, the terminal 348 may be considered as equivalent to the bail 98 in the Lee patent, the bail being pivoted as at 99. The terminals 328, 342 and 348 may be connected to the key punch, for example, by means of the cable 18 of FIGURE 1.

The relay winding 344 actuates a normally open set of contacts 344*a*. The winding, when energied, closes the movable contact "*a*" of this set into engagement with the fixed contact "*b*." The movable contact "*a*" of the set of contacts 344*a* is grounded and the fixed contact "*b*" of this set is connected to the movable arm of the switch section 310*a*. The set of contacts 344*a* is shunted by a capacitor 350 and a series resistor 352. These latter elements serve to suppress arcing across the contacts of this set.

The movable arm of the switch section 310*a* is connected to the cathode of a diode 353. The anode of this diode is connected to the movable arm of the switch section 300*a*. The neutral contact of this latter switch is open circuited. The other contacts 1–10 of this section are respectively connected to the terminals 204*a*–204*j* associated with the racks, such as the rack 40. The terminals 141*a*–141*j* of the commutator 120 are connected, for example, through the cable 16 of FIGURE 1 to the key punch machine 14. These latter terminals are each connected to a corresponding terminal in the key punch mechanism. The terminals 141*a* to 141*j*, inclusive, of the commutator 120 are respectively connected to the terminals 50 to 59 inclusive in I.B.M. schematic 228001P. The terminals 141*a* to 141*j*, inclusive, are respectively connected to the different magnets 60 which are shown in FIGURE 9 and which are described in the second column of page 4 of the Von Pein specification. The control is such that whenever a ground is placed on any one of the terminals 141*a*–141*j*, the key punch is operated to punch a hole on the card being processed. The hole punched is at a position on the card corresponding to the digit represented by the particular one of the commutator terminals grounded at that particular instant.

FIGURE 18 shows a fragment of a typical card 400 used in the key punch mechanism 14 and on which the information or data is punched. The card 400 may be made from a relatively stiff cardboard having dimensions of approximately 3¼" x 7½". The card is provided, for example, with horizontal rows of information. These rows are arranged to form a plurality of vertical columns. There may, for example, be ten horizontal rows so that each column may represent a sequence of numbers from 0 to 9 inclusive, with the numbers in each column being horizontally aligned with corresponding numbers in other columns.

In known manner and by appropriate program cards, any number of vertical columns on the card 400 can be made to represent a field. For example, if the data to be recorded has six digits, it would be appropriate to have each field on the card represented by six vertical columns. Then, a plurality of fields of data can be recorded on the card. These fields may all embrace the same number of columns when the data in each field is to have the same number of digits, or the fields may embrace different numbers of columns for different sets of data of varying numbers of digits.

When a card is brought into place in the key punch and positioned at the start of its first field, as set by the program card in the key punch, the tube 340 is rendered conductive in the manner explained. Now, when the first set of data is set up on the racks of the adding machine and when the adding machine has been actuated to its latched position with the rack brushes in contact with the commutator, the switch 200 closes, as explained previously. This closure of the switch 200 causes the relay winding 324 to be energized. When the winding 324 is energized, the movable contact "*b*" of the set of contacts 324*a* engages the fixed contact "*a*." This places a ground on the movable contact "*c*" of the set of contacts 300*e*. (The set of contacts 310*e* being closed because the stepping winding 310*c* is not energized.) The normally closed contacts "*a*" and "*c*" of the set of contacts 300*e* complete this ground connection to the relay winding 300*d* to energize that winding. When the winding 300*d* is energized, it draws the movable contact "*c*" of the set of contacts 300*e* away from the contact "*a*" and into engagement with the contact "*b*." This breaks the original energizing circuit to the winding 300d. Therefore, the movable arm "c" of the set of contacts 300e falls back on the contact "a" to re-energize the winding 300d. Then the cycle repeats. When the winding 300d is first deenergized, the movable arms of the switch sections 300a, 300b and 300c rise from the respective neutral contacts "n" to the respective first contacts of the switch sections. Subsequent energizing and deenergizing of the winding 300d causes these arms to rise from one contact to the next. This self-stepping action in these switch sections continues until the movable arm of the switch section 300b reaches a contact that will establish a connection through to the key punch mechanism 14.

The patch board 334 is arranged so that whenever the number of digits to be punched in any field is less than 9, the stepping switch 300 will self-step up to a position in which the number of digits to be punched corresponds to the remaining contacts in the section 300b. This is to assure that the switch sections 300a, 300b, 300c will be stepped to their number 10 contacts and then returned to their neutral position at the end of each field, regardless of the number of digits in any one of the fields. For example, if four digits are to be punched in a field, the number 7 contact of the section 300b, which is connected to the number 7 input contact of the patch board 334, is connected through the patch board to output contact 1 of the patch board (as shown by the broken line). Therefore, the stepping switch 300 self-steps through the energizing and deenergizing action of the contacts 300e until the movable arm of the section 300b reaches contact 7. When this occurs, a connection is established from this contact through contact 1 of the switch section 310a and through contact 7 of the switch section 300a to the rack terminal 204d.

The brush connected to the terminal 204d contacts a commutator strip determined by the position of the rack corresponding to the terminal 204d. This commutator strip is connected through its terminal to the corresponding punch actuator in the key punch mechanism 14. It will be noted that the movable arm of the switch section 300b is moved to its contact 7 of that section upon the deenergizing of the relay winding 300d subsequent to the previous energizing of this winding after the movable arm was moved to engagement with contact 6 of this switch section. Now, the next time that the relay winding 300d is energized by the contacts 300e, a ground is placed on the number 7 contact of the section 300b. This follows because the contacts 310e are closed and because the contact set 324a has its grounded movable contact "b" closed on its contact "a." Therefore, the necessary ground connection is provided for the selected punch actuator in the key punch mechanism 14, and the first digit of the first field of the card being processed is punched. This digit has the greatest numerical significance in the field being processed.

The card being processed in the key punch is now moved by the key punch to a position corresponding to the next digit in the first field. This causes the tube 340 to become nonconductive, and the relay winding 324 to be deenergized. However, the switch 200 is still closed, and it remains closed until the end of the field. That is, the switch 200 remains closed until the set of data now represented by the racks is transferred to the card being processed in the key punch.

When the tube 340 becomes nonconductive, the movable contact "b" of the contact set 324a falls back against the contact "c." The ground connection is therefore removed from the movable contact "c" of the contacts 300e. The stepping winding 300d now becomes deenergized moving the arms of the stepping switch 300 to contact 8 in each switch section. However, because of the removal of the ground connection from the movable contact "c" of the contacts 300e, this winding is not reenergized through these contacts. Therefore, the self-stepping action of the switch 300 is now terminated.

The contact set 324a now brings the relay winding 344 into the circuit, and the engagement of the contacts "b" and "c" in this set causes this winding to be energized. As previously noted, a positive voltage is impressed on the terminal 348 under the control of the key punch mechanism when the card being processed is in place and ready to receive its punch for the next digit in the particular field. When this occurs, the relay winding 344 is energized and the contact 344a closes to provide the necessary ground to contact 8 of the switch section 300a.

The contact 8 of the switch section 300a is connected to the rack brush terminal 204c. Then, the particular position of the corresponding rack with respect to the commutator determines the next digit to be punched by the key punch. It will be noted that there is no connection through the patch board 334 between the subsequent contacts 8, 9, 10 of the switch section 300b and contact 1 of the switch section 310a which is presently being contacted by the movable arm of the latter switch section. The patch board connections are used only to establish the first digit of each field. After the next digit is punched, key punch mechanism removes the voltage from the terminal 348, and the relay winding 344 is deenergized to open the contacts 344a.

Each time the contacts 344a are closed by the relay 344, the stepping winding 300d is energized through the closed contacts 300f. It will be remembered that the contacts 300f are closed whenever the arms of the switch 300 are off their respective neutral contacts. Therefore, each time the contacts 344a open at the termination of a punching operation at the key punch, the stepping winding 300d is deenergized to step the movable arms of the switch 300 to their next contacts. The diode 336 prevents transients from energizing of the winding 300d and producing spurious stepping action in the switch 300.

Now when the card being processed is positioned by the key punch to receive its next and third digit in the field, a positive voltage is again placed on the terminal 348 and the contact 344a is again closed by the energizing of the winding 344. This establishes a ground connection through the number 9 contact of the switch section 300a to the terminal 204b of the next rack brush. Likewise, for the next cycle, the necessary ground connection is established by the contacts 344a through contact 10 of the switch section 300a to the rack terminal 204a. The diode 353 prevents spurious actuation of the key punch 14 by transients, and the like.

When the movable arms of the sections of the switch 300 moves to the respective number 10 contacts, which due to the self-stepping action described above always occurs at the end of the particular field, a connection is established from the grounded arm of the switch section 300c through its contact 10 and through the diode 330 to the stepping winding 310c. This causes the latter winding to become energized to step the switch sections 310a and 310b of the stepping switch 310 from their number 1 contacts to their number 2 contacts. The movable arms of these latter switch sections are actuated as the card is processed from one of its fields to another, and the switch 310 shall be termed the "field" stepping switch.

When the stepping switch 300 returns to its neutral position at the completion of the processing of the first field, the movable arm of the switch section 300c moves in effect from its contact 10 to its neutral contact "n." This deenergizes the field relay stepping winding 310c. The winding 310c, however, and its associated circuit are designed to have a sufficient time delay so that the contacts 310f controlled by that winding will remain closed until energizing contact is again established to the winding 310c through the contacts 310f from the neutral contact of the switch section 300c. The diode 332 is connected with a polarity such that the solenoid winding 174 cannot be energized when the movable arm of the switch section 300c is at the number 10 contact. However, the solenoid winding is energized when the connection is established through the neutral contact of the switch section 300c. The diode 330 assures that spurious transient surges will not energize the stepping winding 310c.

The solenoid winding 174 becomes energized, as noted above, when the movable arm of the switch section 300c engages the neutral contact of this section. This causes the solenoid to disengage the latch 170 in the adding machine and permit the adding machine to complete its cycle back to its "home" position in the manner described. Switch 200 now opens to deenergize the solenoid winding 174 and the field relay stepping winding 310c. The contacts 310f are, therefore, opened. It is clear that subsequent closure of the switch 200 will not energize either the solenoid winding 174 or the field stepping winding 310c until the movable arm of the switch section 300c again rises to its contact 10.

The system is now ready to begin recording data on the second field of the card. When the card moves into position, the tube 340 is again conditioned to be conductive. As the data is set up in the adding machine and the commutator 21 is again brought into its latched position against the brushes, the switch 200 closes and the relay winding 324 becomes energized.

The system undergoes a second set of operations for the second field similar to those described in conjunction with the first field. Now, however, if it is desired to record, for example, five digits in the second field, the number 6 input terminal of the patch board 334 is connected to its number 2 output terminal. The previous energizing of the field stepping winding 310c as described above stepped the movable arm of the switch section 310a to its number 2 contact. Therefore, when the switch section 300b self-steps to its number 6 contact, the appropriate ground connection is made through the corresponding rack brush and commutator strip to the key punch. In this manner, the first digit in the second field is punched. The succeeding digits in the second field are now punched in the previously described manner and under the control of the relay winding 344 and its contacts 344a.

The transfer of sets of data from the adding machine to the key punch to be recorded on the card may be continued from field to field. As noted above, the number of digits to be embraced by each field is established by the patch board 334. At the end of each field, the field stepping winding 310c is energized in the manner described to step the movable arms of the field switch sections 310a, 310b from one contact to the next. A patch board connection is made to each contact of the switch section 310a that is to constitute a field, and these connections are made in accordance with the number of digits in the respective fields.

It should be observed that the key punch will automatically punch a "zero" on the card being processed whenever one of the racks contacted during the operation of the relay winding 344 has not been moved in the adding machine. This is because the normal rest position of these racks is at a position corresponding to "zero" on the card. This permits the key punch mechanism to punch zeros automatically in any field in which a lesser number of digits are used than those to which the patch board is adjusted. Therefore, the cards in the key punch are kept in proper synchronism with the adding machine.

At the end of each field, the movable arm of the switch section 310b of the field stepping switch 310 moves from one contact to the next. As noted previously, when the processing of any particular card is completed, the key punch machine places a ground on the terminal 328. This energizes the return winding 310d if the movable arm of the switch section 310b is on any one of its contacts 2–10. This energizing of the winding 310d returns the movable arms of the field stepping switch 310 to their number 1 contacts. The number 1 contact of the switch section 310b is not connected into the circuit so that a sustained ground connection on the contact 328 will not burn out the winding 310d. Therefore, on the completion of the transfer of data into the last field on the card being processed, the stepping switch 300b is controlled so that its arms pass from its number 10 contacts to its neutral contacts. Then, the movable arms of the field stepping switch 310 are returned to their number 1 contacts in the described manner. The system is now in condition to record data on the next card.

The invention provides, therefore, an improved and simplified control apparatus for a key punch mechanism. In the manner described, this control apparatus is in the form of a modified adding machine. It permits flexible and essentially continuous control of the key punch mechanism to be achieved. Moreover, the improved control apparatus of the invention minimizes errors since erroneous punching of any particular card can usually be corrected in the adding machine before the information is transmitted to the key punch mechanism.

What is claimed is:

1. Apparatus for providing a recording of data on an information card having a plurality of different columns, including, a plurality of first members disposed for movement from a reference position to different positions corresponding to one set of data to be recorded on the card, a corresponding plurality of electrically conductive brush members respectively mounted on said first named members, a commutator disposed relative to said brush members to selectively establish electrical connections with said brush members in accordance with the individual positions of said first named members, means coupled to said first members for causing said first members to move simultaneously to said different individual positions, a control mechanism actuable to bring said commutator into and out of contact with said brush members after said brush members are in said different positions, means including a control element operative to actuate said control mechanism, and means responsive to the energizing of the commutator for sequentially recording information on successive columns of the cards in accordance with the positioning of the different brushes in the plurality relative to the commutator.

2. Apparatus for providing a recording of data on an information card having a plurality of different columns, including, a plurality of first members movable to different positions to represent different information, means including a plurality of rack members disposed respectively relative to the first members in the plurality for movement from a reference position to different individual positions corresponding to a set of data represented by the positioning of said first members, means including keyboard means for producing movement of said first members in accordance with the actuation of said keyboard means to represent the set of data, a corresponding plurality of electrically conductive resilient brush members respectively mounted on said rack members, a commutator disposed relative to said brush members on said rack members to selectively establish electrical connections with said brush members in accordance with the individual positions of said rack members, a cyclic control mechanism coupled to the first members and operative upon the rack members and the commutator for causing said rack members to move to said different individual positions in accordance with a set of data represented by the positioning of said first members and for then bringing said commutator into and out of contact with said brush members, means including a control element coupled to the cyclic control mechanism to actuate said control mechanism through each of the operating cycles of the control mechanism, and means coupled to the commutator for sequentially obtaining a recording of information of the card in successive columns in the plurality in accordance with the individual positions of the different rack members in the plurality.

3. The apparatus defined in claim 2 in which said cyclic control mechanism is operatively coupled to the first members to condition said first members to become positioned in accordance with a succeeding set of data from said keyboard means upon each cycling of the control mechanism and prior to bringing said commutator out of contact with said brush members.

4. Apparatus for providing a recording of data on an information card having a plurality of different columns, including: means including a keyboard for setting up a set of data individually consisting of a plurality of digits of information in a predetermined sequence; means including a plurality of first members coupled to the keyboard for obtaining a simultaneous movement of the members in accordance with each set of data set up in the keyboard; means including a plurality of racks coupled to the first members for obtaining a movement of the racks from a reference position to respective individual positions in accordance with the movements of the first members; a corresponding plurality of electrically conductive resilient brushes mounted on respective ones of said racks and movable therewith; a commutator disposed relative to the brushes in the plurality to establish selective electrical connections to said brushes in accordance with the respective positions of said racks; a cyclic control mechanism coupled to said racks and commutator and operative on a cyclic basis and sequentially in each cycle to obtain a movement of said racks to respective individual positions corresponding to a set of data represented by the movements of said first members, to obtain a movement of said commutator into engagement with said brushes, to obtain a disengagement of said commutator from said brushes, and to obtain a return of said racks to said reference position; means including a manually actuated control element coupled to the control mechanism for operating said control mechanism through one of its operating cycles for each actuation of such control element; and means coupled to the commutator during the periods of engagement between the commutator and the brushes for obtaining a recording on the card in successive columns in the plurality of information represented by the individual positions of the racks.

5. Apparatus for providing a recording of data on an information card having a plurality of different columns, including: a keyboard for setting up a set of data individually consisting of a plurality of digits of information in a predetermined sequence; means including a plurality of first members coupled to said keyboard for movement in accordance with the set of data set up in the keyboard; a plurality of racks controlled to be shifted from a reference position to respective individual positions; a corresponding plurality of electrically conductive resilient brushes mounted on respective ones of said racks and movable therewith; a commutator disposed in a first position out of engagement with the brushes in the plurality and movable to a second position to establish selective electrical connections to said brushes in accordance with the respective individual positions of said racks to produce a distinctive pattern of electrical signals corresponding to such respective positions; a cyclic control mechanism operatively coupled to said racks and commutator to cause said racks to be moved successively in each operating cycle of such mechanism to respective distinct positions corresponding to a set of data represented by the positioning of said first members, to initially obtain a movement of said commutator to the second position in engagement with said brushes, to subsequently obtain a movement of the commutator to the first position out of engagement with said brushes, and to subsequently obtain a return of said racks to said reference position; and means including a control element disposed for actuation from a first position to a second position and coupled to said control mechanism for causing said control mechanism to move through one of its operating cycles upon each such movement of the control element; means coupled to the keyboard and to the control element for rendering said keyboard inactive when said control element is moved to its second position; means operatively coupled to the control mechanism for returning said control element to its first position and for reactivating said keyboard at a selected point in each of said operating cycles of said control mechanism and when said commutator is in engagement with said brushes; and means coupled to the commutator for obtaining a sequential recording of information on successive columns of the card in accordance with the positioning of the racks in the plurality and during the period of engagement between the commutator and the brushes in the plurality.

6. The apparatus defined in claim 5 and which further includes means coupled to the control mechanism for interrupting each of said operating cycles of said control mechanism at said selected point, and electrically controlled means for automatically terminating the interruption of each such cycle upon the recording of information in accordance with said electrical signals from said commutator.

7. Apparatus for providing a recording of data on an information card having a plurality of different columns, including: a keyboard actuable to set up different information, means including a plurality of first members movable in accordance with the information set up in said keyboard, a plurality of rack members disposed for movement from a reference position to different individual positions, a corresponding plurality of electrically conductive resilient brush members respectively mounted on said rack members, a commutator disposed in a first position in coupled relationship to the brushes for selectively establishing electrical connections with said brush members in accordance with the individual positions of said rack members and movable to a second position out of coupled relationship with the brushes, a cyclic control mechanism coupled to the rack members and responsive to the movements of the first members for simultaneously establishing said rack members at different individual positions corresponding to a set of data represented by the positioning of said first members and for subsequently returning said rack members to a reference position, means actuated by said control mechanism for moving said commuatator from the second position out of contact with said brush members to the first position in contact with said brush members and for subsequently returning said commutator to its second position and operative upon said control mechanism for obtaining a return of said rack members to said reference position, means coupled to the keyboard and the first members for conditioning said keyboard and first members prior to such return of said rack members to said reference position to enable a second set of data to be set up in said keyboard for a corresponding displacement of said first members, and means responsive to the signals from the commutator in the first position of the commutator for sequentially obtaining a recording of information on the card in the successive columns in the plurality and in accordance with the individual positions of different racks in the plurality.

8. Apparatus for providing a recording of data on an information card having a plurality of different columns, including, a keyboard actuable to represent different information, means including a plurality of first members coupled to said keyboard for displacement in accordance with the actuation of said keyboard, a plurality of rack members disposed for movement from a reference position to different individual positions, a corresponding plurality of electrically conductive resilient brush members respectively mounted on said rack members, a commutator for selectively establishing electrical connections with said brush members in accordance with the individual positions of said rack members to produce output signals representative of such individual positions, an electric drive motor, control means disposed in coupled relationship to said motor to be driven from a home position in which said rack members are in their reference position to a second position in which said rack members assume different individual positions corresponding to displacement of such first members and to be then returned to said home position, means responsive to the positioning of said control means for mechanically coupling said control means to said motor when said control means is in its home position and for subsequently decoupling said control means from said motor upon its return to its home position, and means actuated by said control means for moving said commutator from a first position out of contact with said brush members to a second position in contact with said brush members when said control means is driven to its second position and for returning said commutator to its first position when said control means is returned to its home position, and means responsive to the signals from the commutator in the second position of the commutator to obtain a sequential recording of information on the card in successive columns in the plurality and in accordance with the individual positions of the different rack members in the plurality.

9. The apparatus defined in claim 8 and which includes means responsive to the movements of said control means for decoupling said control means from said motor when said control means is driven to its second position to maintain said control means in its second position until information correspondng to the output signals from said commutator is recorded.

10. The apparatus defined in claim 9 and which includes means responsive to the disposition of said control means for conditioning said first members to receive a succeeding set of data when said control means is in its second position and before said commutator is returned to its first position.

11. Apparatus for providing a recording of data on an information card having a plurality of fields and a plurality of columns in each field for providing such recording in accordance with data from an accounting machine, including, a plurality of members movable from a reference position to different positions corresponding to the data to be recorded from the accounting machine in the different columns in a particular field on the card, means operatively coupled to the accounting machine for obtaining a movement of the members to the different positions in accordance with the data from the accounting machine to be recorded on the card for the particular field, means coupled to the members in the plurality for converting the positions of the members into a plurality of electrical signals representing the positions of the different members in the plurality and for producing such conversion after the movements of the members to the different positions in accordance with the data to be recorded on the card for the particular field, means responsive to the different electrical signals in the plurality to obtain the recording on the card of data corresponding to that represented by the electrical signals, means coupled to the last mentioned means for sequentially activating the last mentioned means to obtain a sequential recording of the data in the successive columns on the card for the particular field, and means operatively coupled to the activating means for obtaining a recording of a particular value in the columns of the particular field not otherwise having data recorded, and means responsive to the recording of information in the different columns for each field for obtaining an advance of the card to the next field for the recording of data in the different columns of that field.

12. Apparatus for providing a recording of data on an information card having a plurality of different fields and a plurality of columns in each field, including, a keyboard, a plurality of first members coupled to the keyboard for displacement in accordance with the actuation of the keyboard to represent a first set of data, mechanical means disposed for operative coupling to the first members for movement from reference positions in accordance with the displacement of the first members to indicate by their positioning the first set of data of the keyboard, transducer means operatively coupled to the mechanical means for converting the positioning of the mechanical means into signals representative of such movement after the positioning of the mechanical means from their reference positions, means operatively coupling the mechanical means to the first members for initially obtaining a positioning of the mechanical means in accordance with the information represented by the displacement of the first members and for subsequently obtaining a return of the mechanical means to their reference positions upon the conversion of the positioning of the mechanical means into the signals corresponding to the positioning of the mechanical means, means responsive to the signals produced by the last mentioned means for recording information on the cards in the successive columns in the plurality in accordance with the different signals, and means operative upon the positioning of the mechanical means in accordance with the displacement of the first members and prior to the conversion of this positioning to signals to condition the keyboard and the first members for the displacement of the first members in accordance with the actuation of the keyboard to represent a second set of data.

13. Apparatus for providing a recording of data on an information card having a plurality of fields and a plurality of columns in each field, including, a plurality of members movable from a reference position to different positions corresponding to a first set of data to be recorded in a first particular field on the card, actuating means responsive to the first set of data and operatively coupled to the movable members for obtaining the movement of the members to the different positions in accordance with the first set of data, means responsive to the positions of the movable members for converting the positions of the members into a plurality of electrical signals representing the positions of the members and for producing such conversion after the movements of the members to the different positions in accordance with the data to be recorded on the card for the first particular field, means responsive to the electrical signals and coupled to the card for sequentially operating upon the electrical signals to obtain the recording on the card of the first set of data corresponding to that represented by the electrical signals and to obtain the sequential recording of the first set of data in the successive columns on the card for the first particular field, means operatively coupled to the actuating means for obtaining the introduction of a second set of data to the actuating means before the recording of the first set of data on the card in the first particular field, and means responsive to the introduction of the second set of data to the actuating means for obtaining a transfer of the first set of data to the recording means and for simultaneously obtaining a transfer of the second set of data from the actuating means to the movable members in the plurality.

14. Apparatus as set forth in claim 13 in which means are responsive to the electrical signals to obtain the recording of a particular value in the columns of the first particular field on the card when the actuating means controlling the recording of information in these columns have not been moved to one of the different individual positions representing information to be recorded on the card for the first set of data.

15. Apparatus for providing a recording of data on an information card having a plurality of fields and a plurality of columns in each field, including, an actuatable keyboard, means including a plurality of first members coupled to said keyboard for displacement in accordance with the actuation of said keyboard to represent a first set of data, mechanical means coupled to the first members for movement from reference positions to positions representing the displacement of the first members, transducer means operatively coupled to the mechanical means upon the positioning of the mechanical means to the positions representing the displacements of the first members to convert the positioning of the mechanical means into corresponding electrical signals, means responsive to the electrical signals to obtain a sequential recording of the first data in a first particular field on the card in accordance with the characteristics of the electrical signals, means operatively coupling the mechanical means and the first members for initially obtaining a positioning of the mechanical means in accordance with the information represented by the displacement of the first members and operatively coupled to the recording means for subsequently maintaining the mechanical means in the displaced positions until the recording of the data on the card in the successive columns of the first particular field, means operatively coupled to the transducer means for obtaining a return of the mechanical means to their reference positions upon the conversion of the positioning of the mechanical means to the corresponding electrical signals by the transducer means, and means operatively coupled to the last mentioned means for obtaining displacements of the first members in accordance with a subsequent operation of the keyboard to represent a second set of data and upon a transfer to the mechanical means of the first set of data and before the recording of the first set of data in the columns in the first particular field on the card.

16. Apparatus for providing a recording of data on an information card having a plurality of fields and a plurality of columns in each field, including a plurality of first members movable from reference positions to different positions corresponding to a first set of data to be recorded in a first particular field on the card, actuating means movable from reference positions to individual positions in accordance with the first set of data and operatively coupled to the first members for obtaining a movement of the first members from the reference positions to the different individual positions in accordance with the displacement of the actuating means from reference positions and in representation of a first set of data to be recorded in the different columns in a first particular field on the card, transducer means operatively coupled to the first members for converting the different individual positions of the members into a plurality of electrical signals individually representing the different individual positions of the members and for producing such conversion upon the movements of the members to the different individual positions, transfer means sequentially responsive to the electrical signals to obtain the recording on the cards in the different columns in the first particular field of data corresponding to that represented by the electrical signals, means responsive to the movement of the first members to the different individual positions for obtaining a return of the actuating means to the reference positions for new individual positionings of the actuating means in accordance with a second set of data and before any recording of information on the cards in accordance with the individual positioning of the first members in representation of the first set of data, and clearing means operatively coupled to the actuating means to return the actuating means to their reference positions from the individual positions representative of the second set of data and without any passage of signals to the recording means from the transducer means in representation of the first set of data.

17. Apparatus for providing a recording of data on an information card having a plurality of fields and a plurality of columns in each field, including an actuatable keyboard, means including a plurality of first members coupled to the keyboard for displacement in accordance with the actuation of the keyboard, mechanical means operatively coupled to the first members for movement from reference positions in accordance with the displacement of the first members to indicate by their positioning the information obtained from the actuation of the keyboard, transducer means operatively coupled to the mechanical means upon the movement of the mechanical means from their reference positions for converting the positioning of the mechanical means into electrical signals representative of the positioning of the mechanical means, means responsive to the electrical signals to obtain the recording of data on the different columns in a first particular field on the card in accordance with the characteristics of such electrical signals, means operatively coupling the mechanical means and the first members for initially producing a positioning of the mechanical means in accordance with the information represented by the displacement of the first members and for subsequently returning the mechanical means to their reference positions upon the conversion of the positioning of the mechanical means into the corresponding electrical signals, and means including a particular key in the keyboard for clearing the information represented by the displacement of the first members upon the operation of the particular key and without any transfer of this information from the first members to the mechanical means.

18. In combination for use with recording means for recording data on an information card having a plurality of fields and having a plurality of columns in each field and for use with an accounting machine constructed to perform arithmetic operations on a digital basis and to produce output indications as to the digital results of such arithmetic operations, control means for indicating a plurality of fields and the number of columns to be activated in each field in the plurality where the number of columns to be activated in each field in the plurality may be different from the number of columns to be activated in the other fields in the plurality, a plurality of actuatable means disposed for coupling to the accounting machine for disposition in accordance with the output indications from the accounting machine in representation of a first set of data, means responsive to the positioning of the actuatable means in accordance with the indications from the accounting machine and responsive to the control means for activating successive actuatable means in the plurality in accordance with the number of columns to be activated in the particular field in the plurality, means responsive to the activation of each actuatable means in the plurality for obtaining an introduction to the recording means of signals representing the disposiiton of the activated actuatable means, means responsive to the recording of indications on the card for each successive column in each particular field to obtain an advance of the card to the next column in that particular field, and cyclic means operatively coupled to the actuatable means and to the accounting machine for freeing the accounting machine for the production of new output indications representing a second set of data upon a disposition of the actuatable means in the plurality in accordance with the particular output indications representing the first set of data from the accounting machine and before the recording of such particular information on the card, and means operatively coupled to the cyclic means for obtaining a disposition of the actuatable means in accordance with the second set of data from the accounting machine upon a passage to the recording means of the signals representing the first set of data from the accounting machine.

19. In combination for use with recording means for recording data on an information card having a plurality of fields and having a plurality of columns in each field and for use with data processing means for processing data and for providing signal indications representing processed data in coded form for the different columns in each field on the card, means for obtaining a sequential presentation of each field and particular columns in the field for the transfer of signal information from the data processing means to the recording means for recording, means coupled to the data processing means for obtaining the reception of first signal information from the data processing means for storage, means coupled to the recording means and responsive to the first signal information for providing for the passage from the receiving means to the recording means of the first signal information in the activated columns in each field, means responsive to the recording in the different columns for each field of information corresponding to the first signal information for obtaining an advance of the card to the next field for the recording of information in the different columns in the next field, cyclic means operatively coupled to the data processing means and to the receiving means for releasing the data processing means for the production of second signal information representing new processed data upon the transfer of the first signal information from the data processing means to the receiving means and before the transfer of the first signal information from the receiving means to the recording means, and means operatively coupled to the receiving means and to the data processing means for obtaining a transfer of the second signal information from the data processing means to the receiving means and a simultaneous transfer of the first signal information from the receiving means to the recording means.

20. In combination for use with recording means for recording data on an information card having a plurality of fields and having a plurality of columns in each field and for use with an accounting machine constructed to perform arithmetic operations on a digital basis and to produce output indications as to the digital results of such arithmetic operations, control means for indicating a plurality of fields and for indicating a plurality of columns in each field where the number of columns in each field may be different from the number of columns in the other fields in the plurality, a plurality of actuatable means disposed for coupling to the accounting machine to become individually positioned in accordance with the output indications from the accounting machine in representation of the values of the different digits in each field, means responsive to the individual positioning of the actuatable means for the different columns in each particular field for obtaining an introduction to the recording means of signals indicative of the individual positioning of the different actuatable means in the plurality, means responsive to the recording of indications on the card for each successive column in each particular field to obtain an advnace of the card to the next column in that particular field, and cyclic means responsive to the disposition of the actuatable means in accordance with the information from the accounting machine for each particular field and responsive to such disposition of the actuatable means before the recording on the card of information representative of such dispositions for freeing the accounting machine for the production of new output indications by the accounting machine for recording in the next particular field on the card.

References Cited in the file of this patent

UNITED STATES PATENTS

| | | |
|---|---|---|
| 1,834,561 | Watson | Dec. 1, 1931 |
| 2,285,289 | Lake et al. | June 2, 1942 |
| 2,285,353 | Peirce | June 2, 1942 |
| 2,303,692 | Hellgren | Dec. 1, 1942 |
| 2,490,348 | Ghertman | Dec. 6, 1949 |
| 2,497,784 | Mechan et al. | Feb. 14, 1950 |
| 2,550,133 | Allan | Apr. 24, 1951 |
| 2,708,550 | Maier | May 17, 1955 |
| 2,861,739 | Chall et al. | Nov. 25, 1958 |